(12) United States Patent
Ochiai

(10) Patent No.: US 7,640,445 B2
(45) Date of Patent: Dec. 29, 2009

(54) POWER-SAVING CONTROL METHOD FOR A NETWORK DEVICE

(75) Inventor: Masato Ochiai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 11/463,547

(22) Filed: Aug. 9, 2006

(65) Prior Publication Data

US 2007/0050532 A1    Mar. 1, 2007

(30) Foreign Application Priority Data

Aug. 26, 2005    (JP) .............................. 2005-245898

(51) Int. Cl.
*G06F 1/26* (2006.01)
*G06F 1/00* (2006.01)
*H04L 12/28* (2006.01)
*G06F 15/177* (2006.01)

(52) U.S. Cl. .................. 713/320; 713/300; 370/255; 709/221

(58) Field of Classification Search ............ 713/300, 713/320; 370/255; 709/221
See application file for complete search history.

(56) References Cited

U.S. PATENT DOCUMENTS

| 5,150,464 | A  | * | 9/1992  | Sidhu et al. ................. 709/222 |
| 5,991,828 | A  | * | 11/1999 | Horie et al. .................... 710/8 |
| 6,101,499 | A  | * | 8/2000  | Ford et al. ..................... 707/10 |
| 6,249,813 | B1 | * | 6/2001  | Campion et al. ............ 709/222 |
| 2004/0064520 | A1 | * | 4/2004  | Takahashi et al. ........... 709/208 |
| 2005/0272481 | A1 | * | 12/2005 | Kim ........................... 455/574 |

* cited by examiner

*Primary Examiner*—Thomas Lee
*Assistant Examiner*—Stefan Stoynov
(74) *Attorney, Agent, or Firm*—Canon U.S.A., Inc. I.P. Division

(57) ABSTRACT

A device communicatable through a network by using an address corresponding to a predetermined communication protocol and capable of entering a power-saving state, the device includes a storage unit configured to store an address being used by the device, and a determination unit configured to determine whether the address stored on the storage unit is usable if the power-saving state is released. If the address stored on the storage unit is usable, the device uses the address.

10 Claims, 20 Drawing Sheets

FIG.20

STORAGE MEDIUM SUCH AS FD, CD-ROM, ETC.

| DIRECTORY INFORMATION |
| --- |
| FIRST DATA PROCESSING PROGRAM<br>PROGRAM CODE GROUP CORRESPONDING TO STEPS<br>IN FLOWCHART SHOWN IN FIG. 5 |
| SECOND DATA PROCESSING PROGRAM<br>PROGRAM CODE GROUP CORRESPONDING TO STEPS<br>IN FLOWCHART SHOWN IN FIGS. 6 AND 7 |
| THIRD DATA PROCESSING PROGRAM<br>PROGRAM CODE GROUP CORRESPONDING TO STEPS<br>IN FLOWCHART SHOWN IN FIG. 8 |
| FOURTH DATA PROCESSING PROGRAM<br>PROGRAM CODE GROUP CORRESPONDING TO STEPS<br>IN FLOWCHART SHOWN IN FIG. 9 |
| FIFTH DATA PROCESSING PROGRAM<br>PROGRAM CODE GROUP CORRESPONDING TO STEPS<br>IN FLOWCHART SHOWN IN FIG. 12 |
| SIXTH DATA PROCESSING PROGRAM<br>PROGRAM CODE GROUP CORRESPONDING TO STEPS<br>IN FLOWCHART SHOWN IN FIG. 13 |
| SEVENTH DATA PROCESSING PROGRAM<br>PROGRAM CODE GROUP CORRESPONDING TO STEPS<br>IN FLOWCHART SHOWN IN FIG. 14 |
| EIGHTH DATA PROCESSING PROGRAM<br>PROGRAM CODE GROUP CORRESPONDING TO STEPS<br>IN FLOWCHART SHOWN IN FIG. 15 |
| NINTH DATA PROCESSING PROGRAM<br>PROGRAM CODE GROUP CORRESPONDING TO STEPS<br>IN FLOWCHART SHOWN IN FIG. 16 |
| TENTH DATA PROCESSING PROGRAM<br>PROGRAM CODE GROUP CORRESPONDING TO STEPS<br>IN FLOWCHART SHOWN IN FIG. 18 |
| ELEVENTH DATA PROCESSING PROGRAM<br>PROGRAM CODE GROUP CORRESPONDING TO STEPS<br>IN FLOWCHART SHOWN IN FIG. 19 |

MEMORY MAP OF STORAGE MEDIUM

POWER-SAVING CONTROL METHOD FOR A NETWORK DEVICE

BACKGROUND OF THE INVENTION

1. Field of the Invention

The present invention relates to a power-saving control of a network device.

2. Description of the Related Art

In recent years, energy-saving standards have become stricter and in order to comply with the standards, some methods of shutting off the power supply of a CPU in a power-saving mode have already come into practical use.

On the other hand, in printers or multifunctional devices for network, it has become increasingly necessary to return from the power-saving mode to a normal operation mode at high speed. Further, since the sizes of programs of recent multifunctional devices have been increasing, if all programs are stored on a ROM, the costs increase. Accordingly, in some of the multifunctional devices, the hard disk is commonly used as an image storage unit, and the programs are also stored on a part of the region of the hard disk.

However, in this case, after start-up, the programs are downloaded from the hard disk to a RAM, and then, the programs are executed on the RAM. As a result of the using the RAM to store such programs, the processing speed of the device becomes slower bringing about a factor which conflicts with the above requirement of high-speed return.

Therefore, a method of shutting off the power supply of CPU while retaining a program expanded on a RAM has been proposed (Japanese Patent Application Laid-open No. 2004-005029). In such a method in which the power-saving mode is realized by shutting off the power supply of CPU, with respect to some network protocols that the device supports, there arises a problem described below. For example, when the APPLETALK network protocol is implemented, in each device on the network which uses the APPLETALK network protocol, a protocol address is dynamically changed.

Accordingly, the protocol address which is used by the device can be allocated to the other device while the device is entering the power-saving mode. That is, the protocol address used before entering the power-saving mode overlaps with the protocol address of the other device, and the protocol address cannot be used any more.

To solve the problem, a device which supports the APPLE-TALK network protocol tries to frequently return from the power-saving mode and monitor packets on the network in order to determine whether there is no problem with the protocol address currently being used (whether it is possible to continue to be used). However, if the device frequently returns from the power-saving mode, it is not substantially possible to enter the power-saving mode to shut down the power supply of the CPU.

Next, as an example of a dynamic protocol address, a DHCP protocol of the TCP/IP is taken. In the case of the DHCP protocol, it is necessary to constantly request a server to update an IP address which is acquired by a device from a DHCP server. Accordingly, if the intervals of the IP address update are short, it is also difficult to enter the power-saving mode.

SUMMARY OF THE INVENTION

The present invention is directed to realizing power-saving by entering a power-saving state even if a network device operates in a condition that an address is dynamically changed such as the APPLETALK network protocol, or the DHCP of the TCP/IP.

According to an aspect of the present invention, a device is provided which is communicatable through a network by using an address corresponding to a predetermined communication protocol and capable of entering a power-saving state. The device includes a storage unit configured to store an address being used by the device; and a determination unit configured to determine whether the address stored on the storage unit is usable when the power-saving state is released; wherein, if the address stored on the storage unit is usable, the device uses the address.

According to another aspect of the present invention, the device uses a new address if the address stored on the storage unit is not usable. According to yet another aspect of the present invention, the determination unit outputs information including the address to the network, and depending on existence of a response, determines whether the address is usable.

According to another aspect of the present invention, the device may further include a control information storage unit configured to store control information for returning to the processing operation at the time when the device enters the power-saving state; and a return unit configured to return to the processing by using the control information stored on the control information storage unit when the power-saving state is released.

According to another aspect of the present invention, the storage unit stores a name which is used by the device and used for identifying the device on the network; the determination unit determines whether the name stored on the storage unit is usable when the power-saving state is released; and the device uses the name when the name stored on the storage unit is usable.

According to another aspect of the present invention, the address is a protocol address of the APPLETALK network protocol or an IP address of the TPC/IP. Moreover, according to yet another aspect of the present invention, the address stored on the storage unit includes a network number; and the determination unit determines whether the address is usable depending on whether the address stored on the storage unit is within a range of a network number of a router.

Furthermore, according to another aspect of the present invention, a control method is provided for a device communicatable through a network by using an address corresponding to a predetermined communication protocol and capable of entering a power-saving state. Here, the method includes storing an address being used by the device on a storage unit; controlling the device to be in the power-saving state; and determining whether the address stored on the storage unit is usable when the power-saving state is released, wherein, if the address stored on the storage unit is usable, the device uses the address.

Additionally, according to another aspect of the present invention, a computer readable medium is provided which contains computer-executable instructions for communicating through a network by a device by using an address corresponding to a predetermined communication protocol and capable of entering a power-saving state. The medium includes computer-executable instructions for storing an address corresponding to a predetermined communication protocol on a memory; computer-executable instructions for controlling the computer to be in a power-saving state; and computer-executable instructions for determining whether the address stored on the memory is usable when the power-saving state is released, wherein, if the address stored on the memory is usable, the computer uses the address.

Further features and aspects of the present invention will become apparent from the following detailed description of the exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the invention and, together with the description, serve to explain the principles of the invention.

FIG. 20 is a view illustrating a memory map of a storage medium (recording medium) for storing various data processing programs readable in the network device according to an exemplary embodiment of the present invention.

DETAILED DESCRIPTION OF THE EXEMPLARY EMBODIMENTS

Exemplary embodiments, features and aspects of the present invention will now be herein described in detail below with reference to the drawings.

First Exemplary Embodiment

Figure 1:
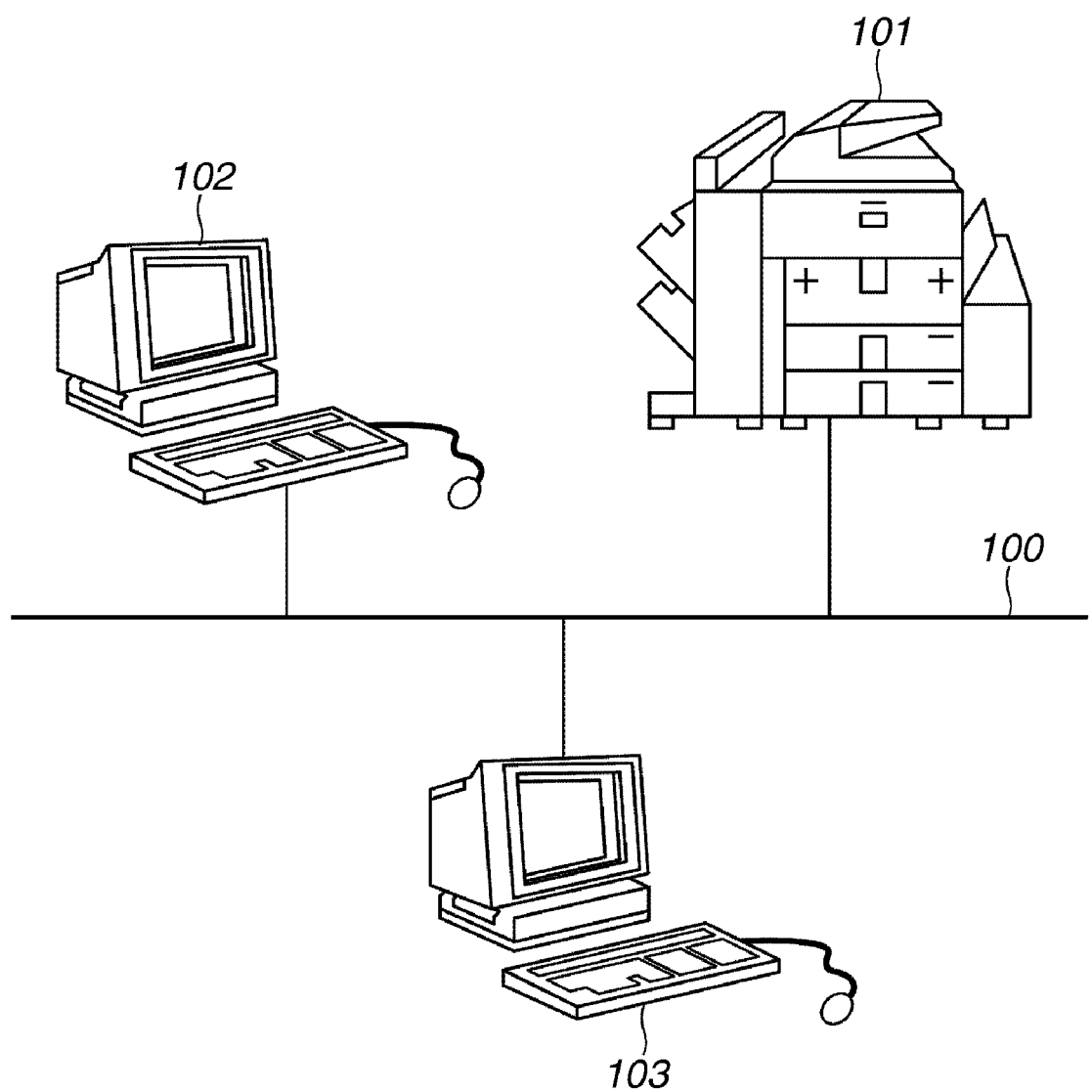
FIG. 1 is a schematic illustration of a system in which a multifunction device which has a network connection function is connected to a LAN as a network device according to an exemplary embodiment of the present invention.

FIG. 1 is a schematic illustration of a system in which a multifunction device which has a network connection function is connected to a LAN as a network device according to an exemplary embodiment of the present invention. In FIG. 1, a multifunction device 101 is connectable to a LAN. The multifunction device 101 provides a local area network (LAN) 100 with a network printing service or a scan service using the APPLETALK network protocol. Further, to the same network, through the LAN 100, a personal computer (PC) 102 equipped with the APPLETALK network protocol is connected. A PC 103 is a protocol router of the APPLETALK network protocol.

Figure 2:
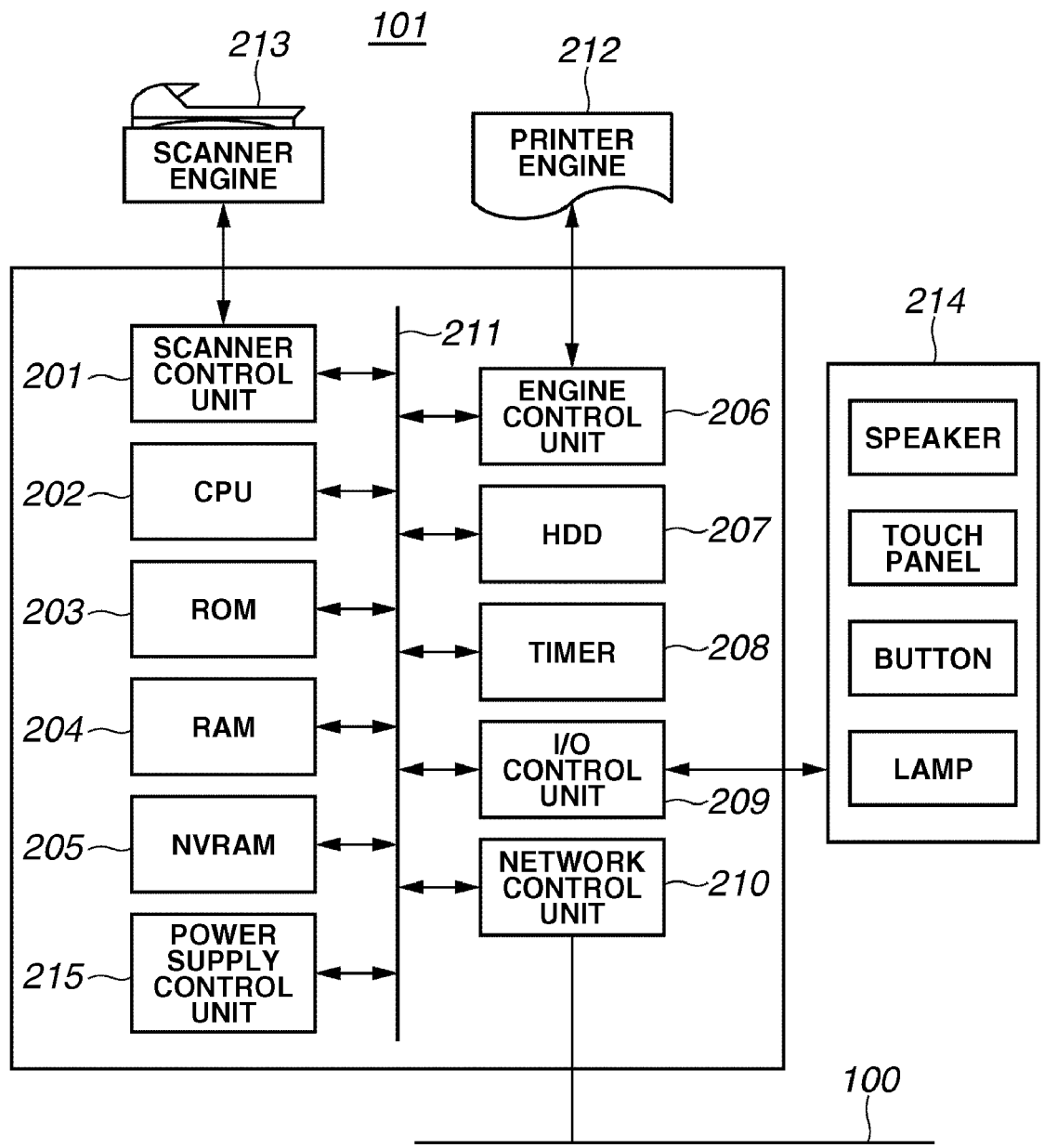
FIG. 2 is a block diagram schematically illustrating an exemplary multifunction device shown in FIG. 1, according to an aspect of the present invention.

FIG. 2 is a block diagram schematically illustrating the multifunction device 101 shown in FIG. 1, and the same reference numerals are labeled to the same elements as in FIG. 1. In FIG. 2, a scanner engine control unit 201 controls a scanner engine 213. A CPU 202 is a high-performance and high-speed CPU to control the entire multifunction device 101. A boot ROM (ROM) 203 program stores a boot program. A RAM (memory) 204 is used as a work area of the CPU 202. A nonvolatile random access memory (NVRAM) 205 retains values set from a panel. An engine control unit 206 controls a printer engine 212. A hard disk drive (HDD) 207 stores programs for controlling devices. On the HDD 207, it is also possible to store image data, various data, or devices.

Reference numeral 208 denotes a timer. An I/O control unit 209 controls a user interface part 214 such as a speaker, touch panel, button, and lamp. A network control unit 210 controls communication with the LAN 100. Reference numeral 215 denotes a power supply control unit, and by controlling the power supply control unit 215, it is possible to enter the power-saving mode (power-saving state). To a bus 211, the above 201 to 210 and 215 are connected respectively.

When the power supply is turned on, the CPU 202 reads the boot program from the ROM 203 and carries out the boot of the device according to the control of the boot program. Further, the CPU 202, according to the boot program, expands the device control program from the HDD 207 onto the RAM 204, and by reading the device control program expanded on the RAM 204, the control of the device is carried out.

Figure 3:
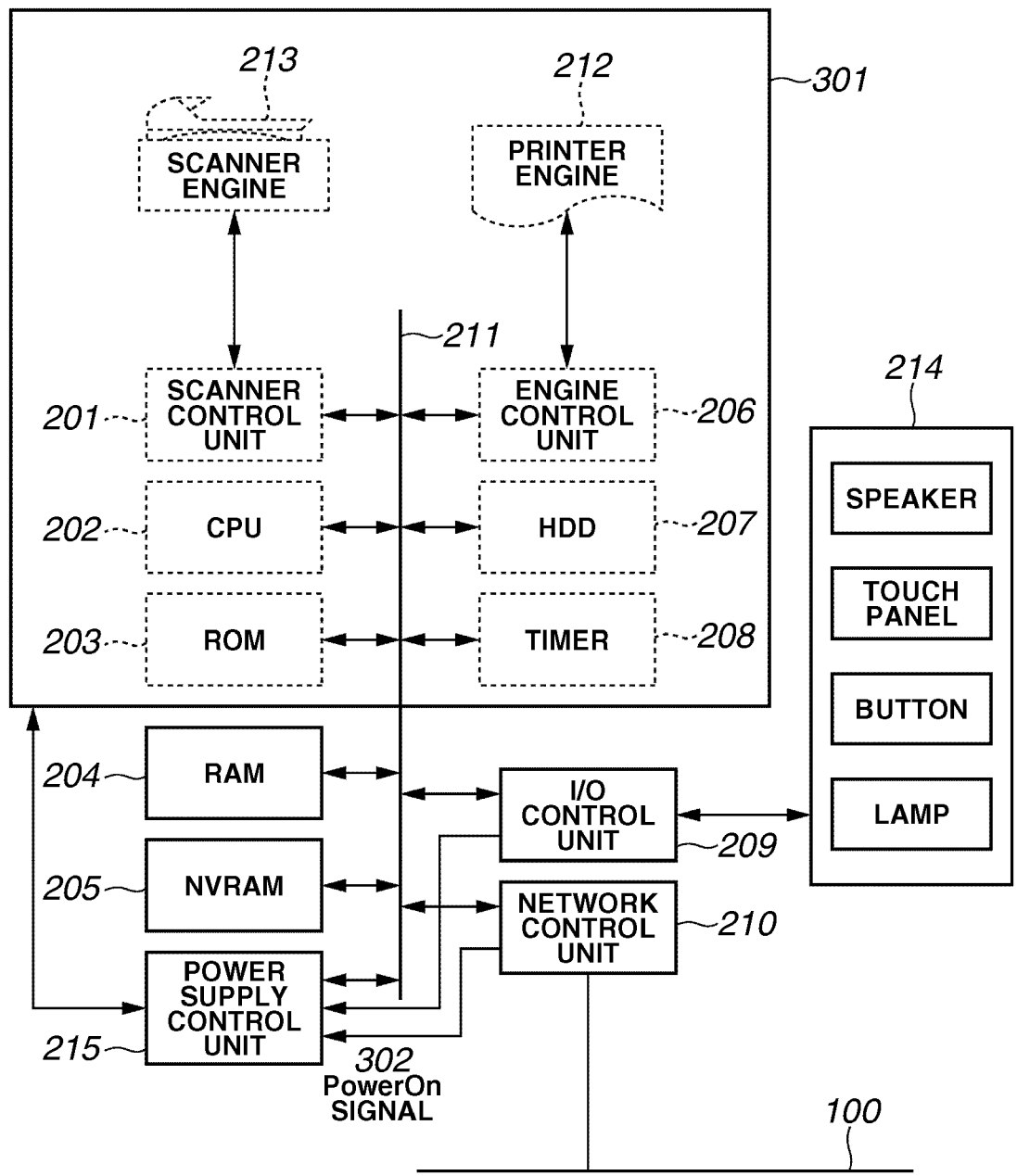
FIG. 3 is a diagram illustrating to which unit power supply is shut off by the power supply control unit shown in FIG. 2, according to an aspect of the present invention.

FIG. 3 is a view illustrating to which unit power supply is shut off by the power supply control unit 215 shown in FIG. 2, and the same reference numerals are labeled to the same elements as in FIG. 2.

As shown in FIG. 3, the power supply control unit 215 can turn on and off the power supply of an area surrounded by reference numeral 301 (a first power supply system). The area surrounded by the reference numeral 301 includes, in particular, the scanner engine 213, the scanner control unit 201, the CPU 202, the ROM 203, the printer engine 212, the engine control unit 206, the HDD 207, and the timer 208. In the area surrounded by the reference numeral 301, relatively large power is consumed. On the other hand, in the area other than the area surrounded by the reference numeral 301 (a second power supply system), relatively small power is consumed. Accordingly, by shutting off the power supply to the area surrounded by the reference numeral 301, it is possible to reduce the power consumption.

When the multifunction device 101 enters the power-saving mode, the power supply control unit 215 shuts off the power supply to the area surrounded by the reference numeral 301 (the first power supply system). Thus, the multifunction device 101 is put in the power-saving state and the low power consumption can be realized. When the process returns from the power-saving mode to the normal operation mode in order to release the power-saving state, power supply is turned on to the area surrounded by the reference numeral 301. In the area other than the area surrounded by the reference numeral 301 (the second power supply system), power supply is retained in both of the power-saving mode and the normal operation mode.

When an instruction to enter the power-saving mode is issued by the I/O control unit 209, or any job is not sent from the network control unit 210 for a given length of time, the CPU 202 instructs the power supply control unit 215 to shut off the power supply to the units in the area 301. Accordingly, the power supply control unit 215 shuts off the power supply to the units in the area 301, and the multifunction device 101 enters the power-saving mode.

Further, even in the power-saving mode, the power supply control unit 215 can receive a PowerOn signal 302 from each unit of in the I/O control unit 209 and the network control unit 210. When the power supply control unit 215 receives the signal, it supplies the power to the units in the area 301 and the multifunction device 101 returns from the power-saving mode to the normal operation mode.

Figure 4:
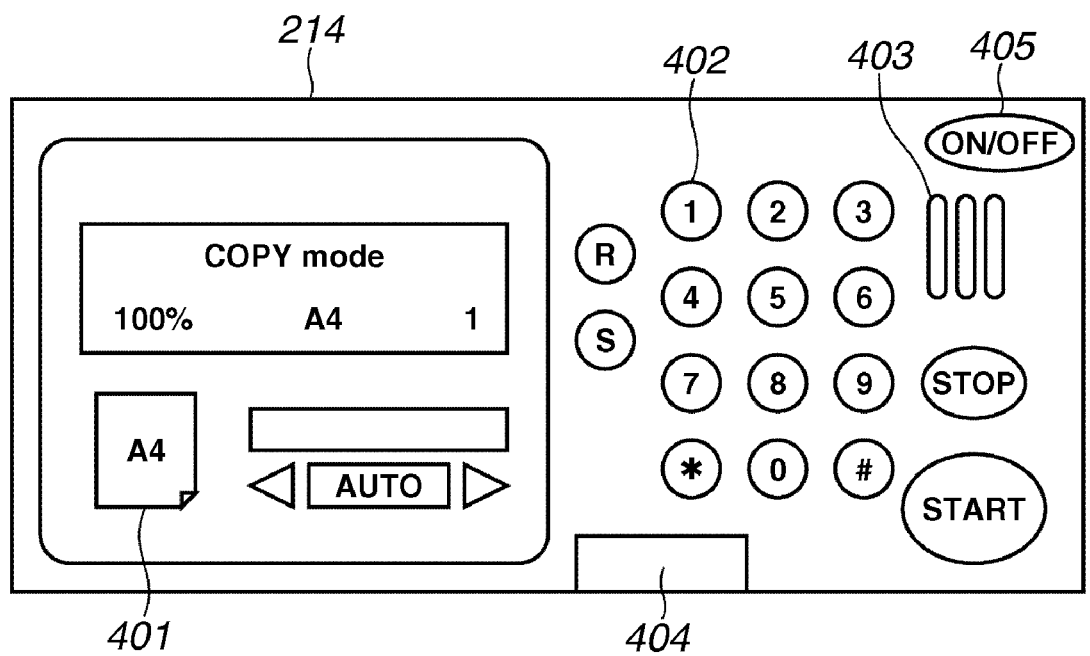
FIG. 4 is a plan view for explaining a configuration of the user interface part shown in FIG. 2, according to an aspect of the present invention.

FIG. 4 is a plan view for explaining a configuration of the user interface part 214 shown in FIG. 2. In FIG. 4, reference numeral 401 denotes a large touch panel, and the user can set various settings by operating the touch panel 401. A screen in FIG. 4 represents a stand-by screen for copying.

A numeric key button 402 is used to input numbers from "0" to "9". A "S" button is a service button. When the service button is depressed, various service screens are displayed on the touch panel, and it is possible to carry out services other than copying. An "R" button is a setting button. When the setting button is depressed, various setting screens are displayed on the touch panel, and it becomes possible to set parameters.

A speaker 403 outputs voice and buzzer sound. A lamp 404 blinks when printing or copying is jammed. An ON/OFF button 405 is used to set the power-saving mode on or off, and by operating the button, the user can instruct the multifunction device 101 to enter the power-saving mode and to return from the power-saving mode to the normal operation mode.

With reference to FIGS. 5 to 8, exemplary processing of start-up of a protocol processing module group of the APPLETALK network protocol at an initialization stage of the network device is described.

Figure 5:
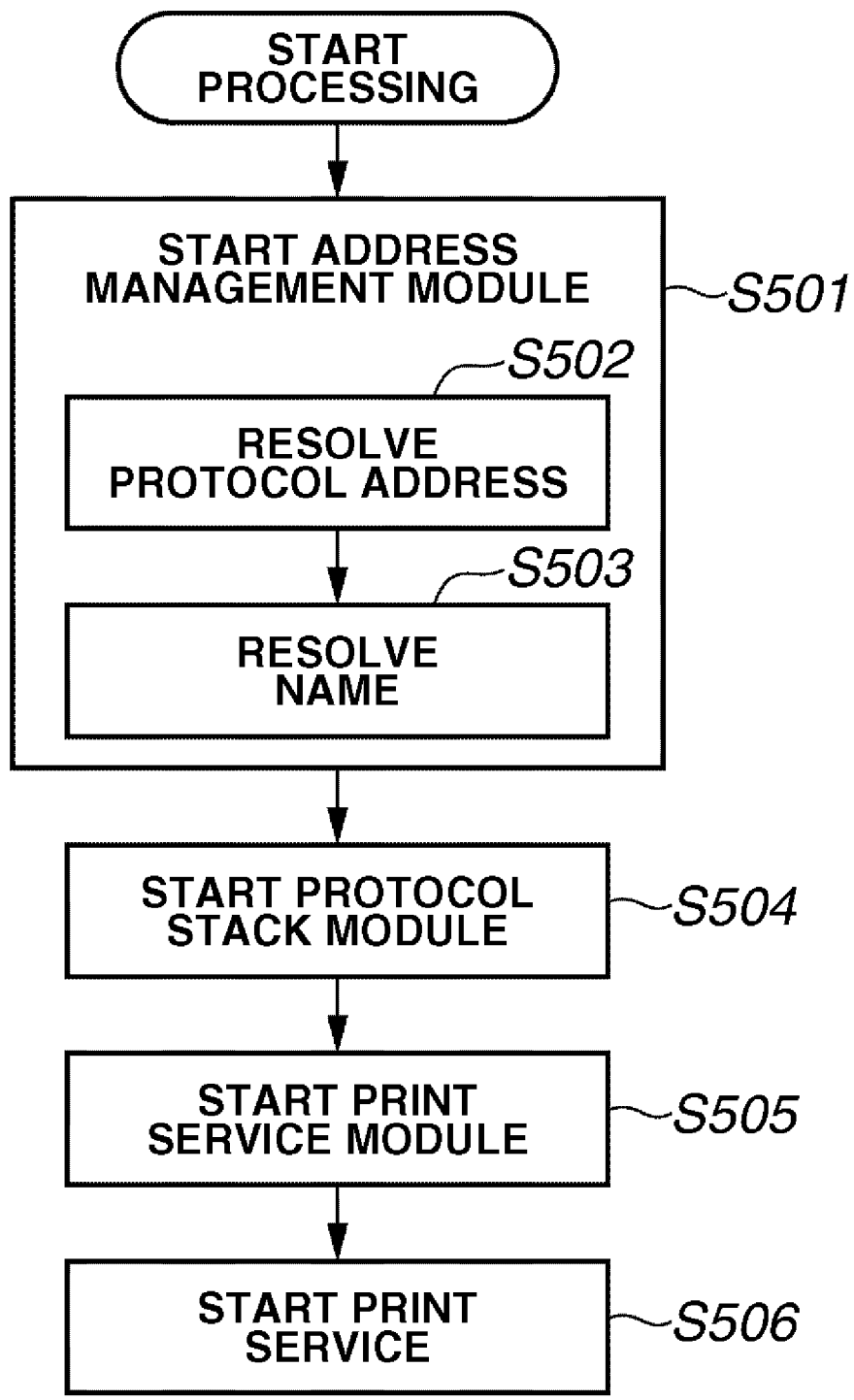
FIG. 5 is a flowchart illustrating an example of a first control processing procedure in a network device, according to an aspect of the present invention.

FIG. 5 is a flowchart illustrating an example of a first control processing procedure in the network device, and corresponds to a flow of the start-up processing of a protocol processing module group (1101 to 1104 in FIG. 11 which will be described below) of the APPLETALK network protocol_at the initialization stage. The processing in the flowchart is realized when the CPU 202 shown in FIG. 2 reads the program stored on the HDD 207 on the RAM 204 and carries out the read program.

When power supply is turned on, the CPU 202 carries out initialization processing of each device unit. Then, if setting is performed so that the service of the APPLETALK network protocol of the multifunction device 101 is effective, the CPU 202 carries out start-up processing shown in the flowchart in order to provide the service of the APPLETALK network protocol on the network.

Figure 6:
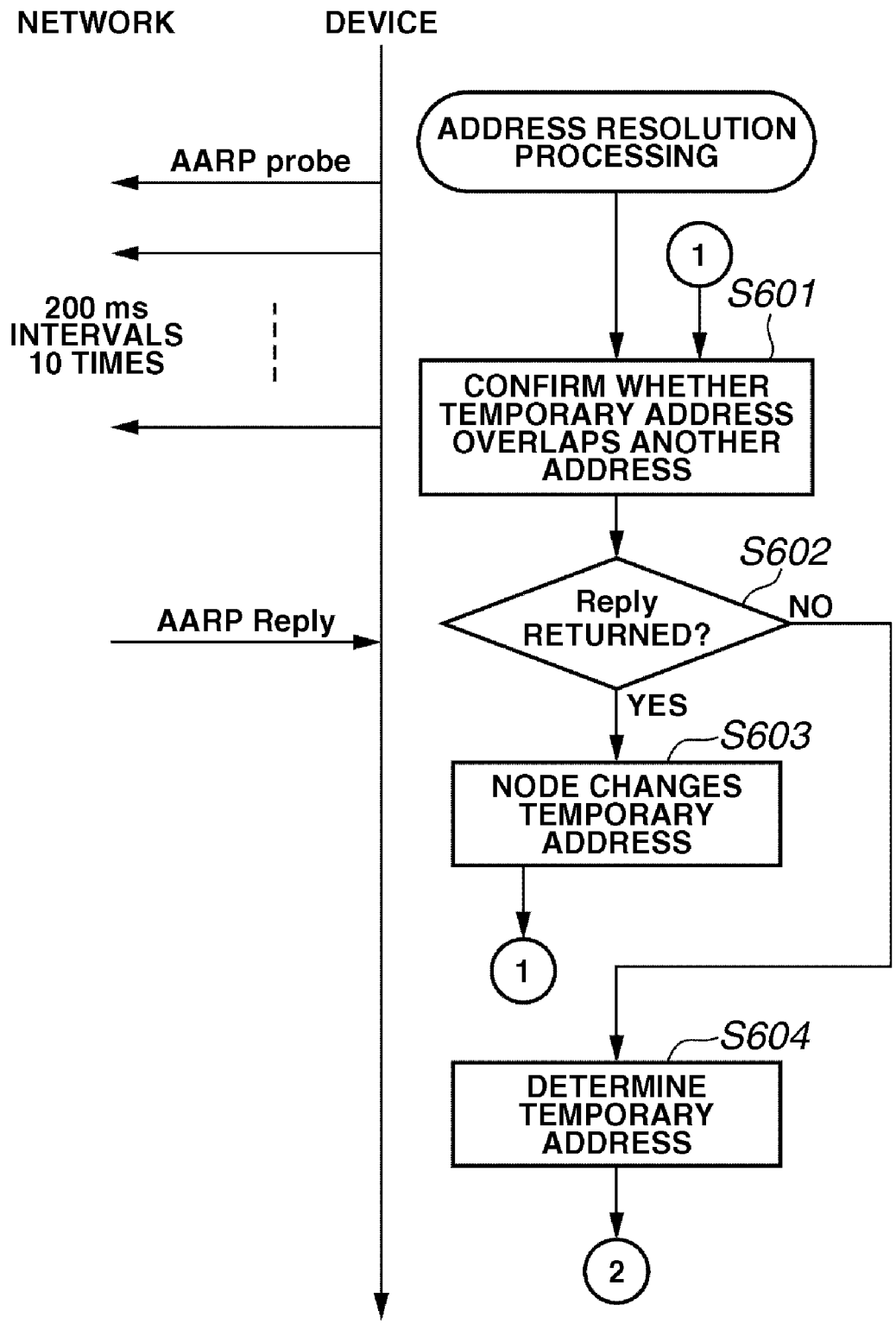
FIG. 6 is a flowchart illustrating an example of a second control processing procedure in the network device, according to an aspect of the present invention.
Figure 7:
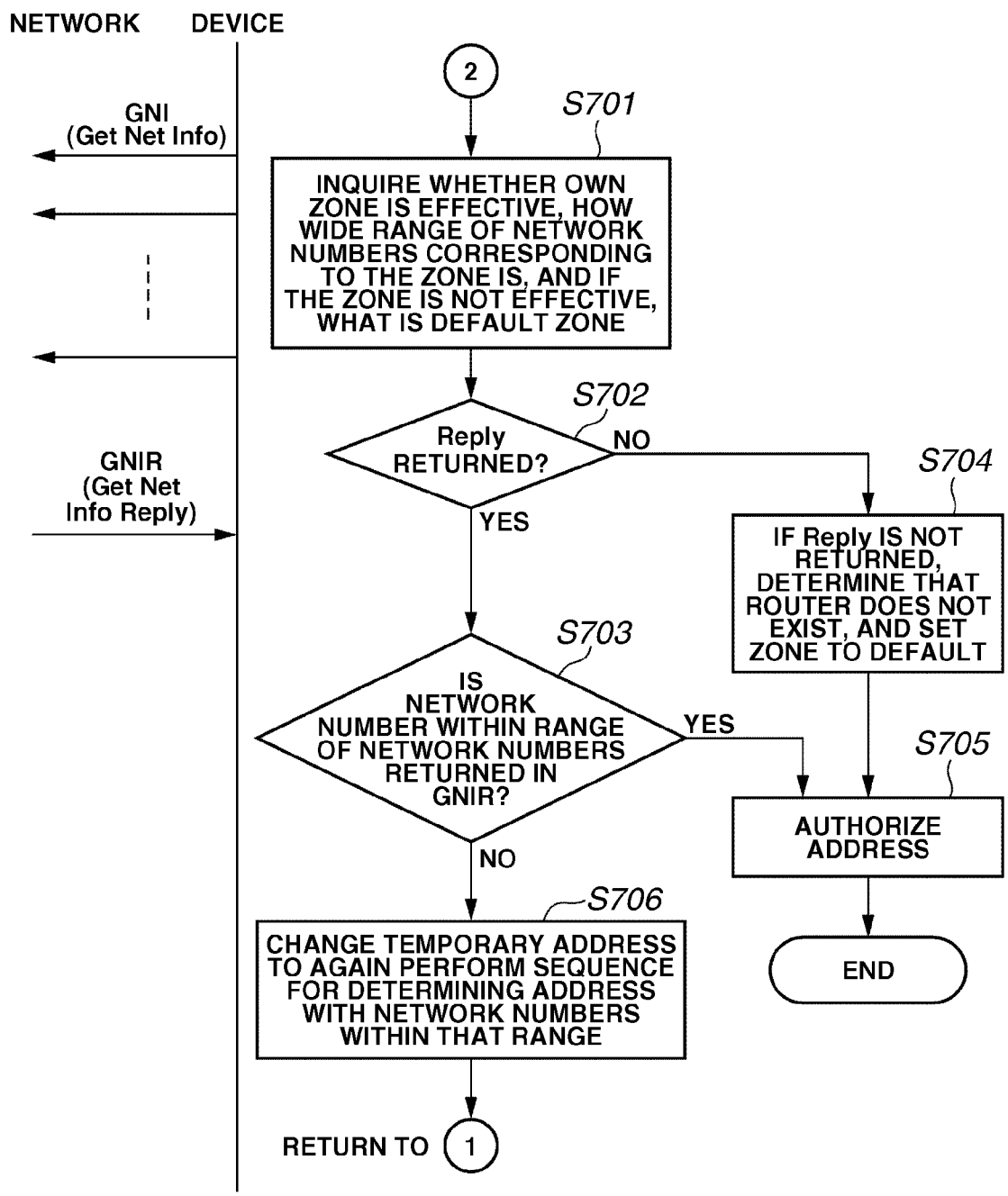
FIG. 7 is a flowchart illustrating an example of the second control processing procedure in the network device, according to an aspect of the present invention.
Figure 8:
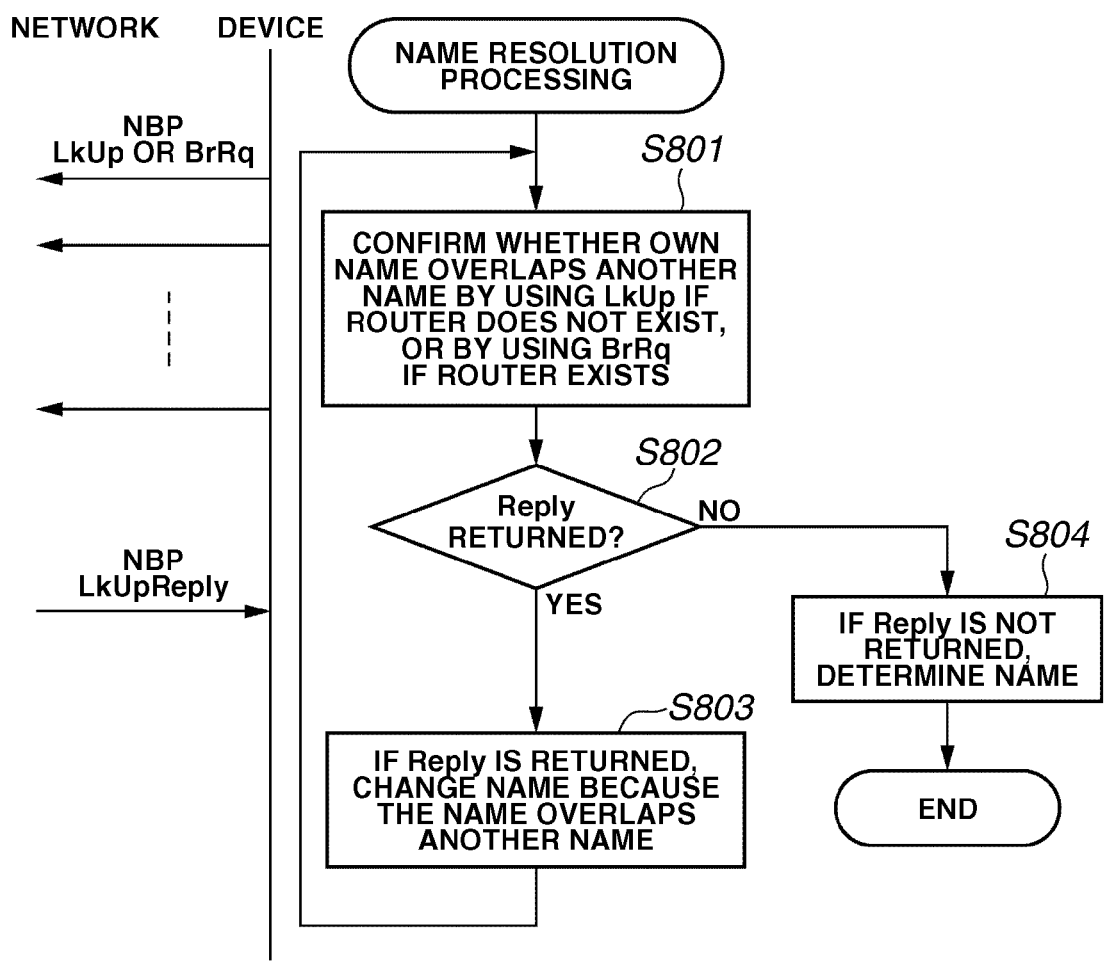
FIG. 8 is a flowchart illustrating an example of a third control processing procedure in the network device, according to an aspect of the present invention.
Figure 11:
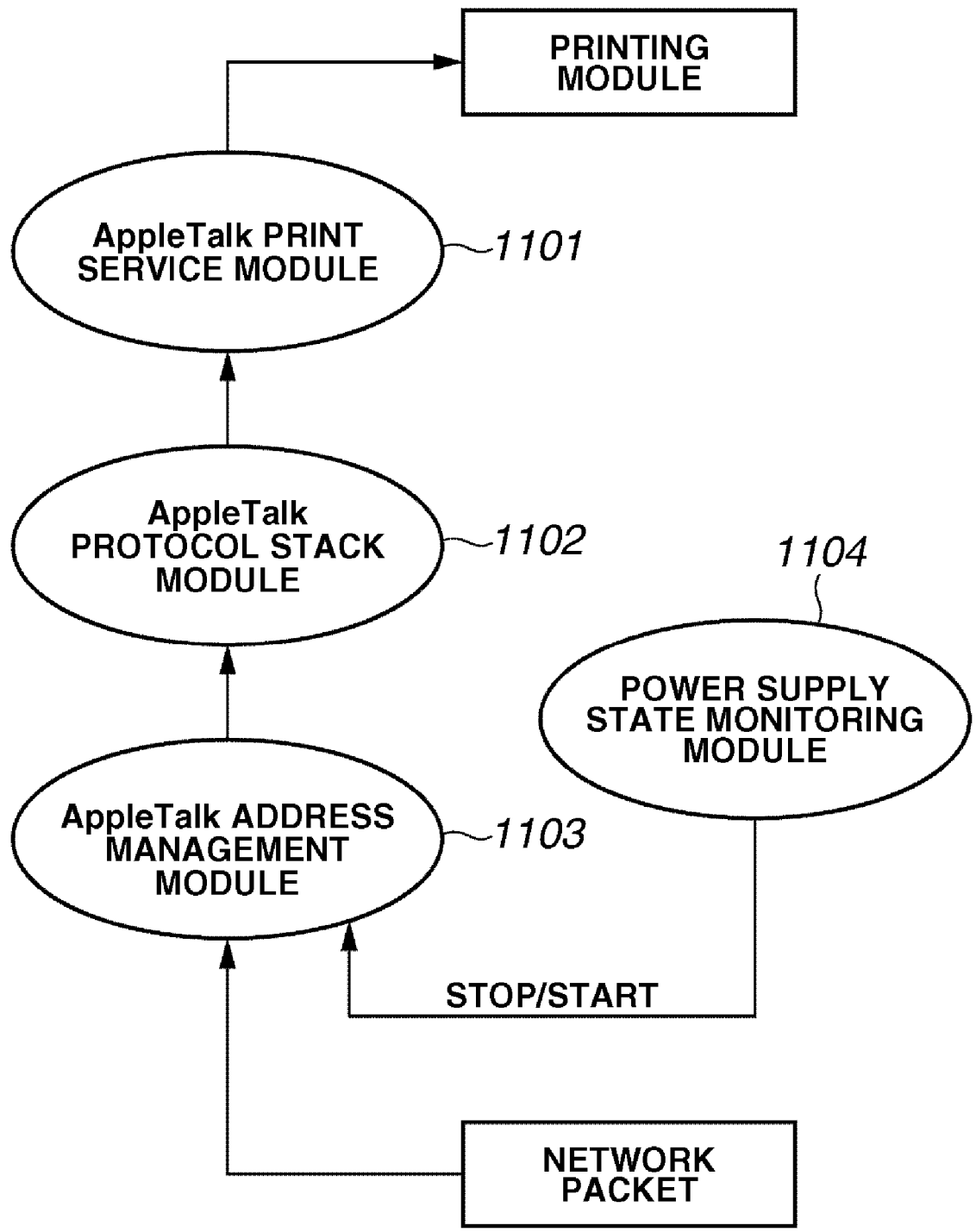
FIG. 11 is a schematic view illustrating a module configuration in the multifunction device shown in FIG. 1, according to an aspect of the present invention.

First, at step S501, the CPU 202 starts an address management module 1103 (FIG. 11). Then, at step S502, the address management module 1103 resolves a protocol address (address resolution processing). The detailed description of the address resolution processing is shown in FIGS. 6 and 7 which will be described below. Then, at step S503, the address management module 1103 resolves a name (name resolution processing). The detailed description of the name resolution processing is shown in FIG. 8 which will be described below. After the address and the name are determined, at step S504, the CPU 202 starts a protocol stack module 1102 (FIG. 11). Then, at step S505, the CPU 202 starts a print service module 1101 (FIG. 11). As a result, at step S506, the CPU 202 can start printing service of the APPLETALK network protocol.

FIGS. 6 and 7 are flowcharts illustrating an example of a second control processing procedure in the network device, and corresponds to the address resolution processing shown in step S502 in FIG. 5. The processing in the flowcharts is realized when the CPU 202 shown in FIG. 2 reads the program stored on the HDD 207 onto the RAM 204 and carries out the read program.

When the address resolution is carried out according to the address management module 1103, at step S601, the CPU 202 sends an AARPProbe packet on the network. In this exemplary embodiment, the AARPProbe packet is sent ten times at intervals of 200 msec. The AARPProbe packets are sent to notify to the devices which provide each APPLETALK network protocol service on the network, a protocol address (temporary address) which the multifunction device 101 will use. The AARPProbe packet includes the protocol address (temporary address) which is to be used by the multifunction device 101.

On the other hand, if the other device is already using the protocol address which is notified by the AARPProbe packets, the other device sends an AARPProbe packet to notify that the protocol address overlaps with the one already used.

Then, at step S602, the CPU 202 determines whether a response (AARPReply) from the other devices on the network, to the AARPProbe packet which is sent at step S601, is received. If the CPU 202 determines that the response (AARPReply) from another device exists (YES in step S602), the CPU 202 determines that the temporary address overlaps, and proceeds to the processing at step S603. At step S603, the CPU 202 changes the temporary address, returns the processing to step S601, and again, sends the AARPProbe packet onto the network.

At step S602, if the CPU 202 determines that there is no response (AARPReply) from the above devices on the network 100 (NO in step S602), to the AARPProbe packet sent at step S601, the processing proceeds to step S604. In this case, the CPU 202 determines that the protocol address selected here (protocol address to which no AARPReply is sent from any other device) can be used as the temporary address. At step S604, the CPU 202 determines that the selected protocol address is to be the temporary address and stores it on the RAM 204. Then, the processing proceeds to step S701 (see FIG. 7).

In the address management module 1103, at step S701, the CPU 202 confirms to which zone its own device belongs. At this time, the CPU 202 sends a GetNetInfo packet on the network. The PC 103 functions as a protocol router of the APPLETALK network protocol, manages information about correspondence between a network number and a physical network, and a correspondence of zones, and sends a reply (Reply) packet to the GetNetInfo packet. The Reply packet includes information about a range of the network number and a default zone.

Then, at step 702, the CPU 202 waits for a reply to the GetNetInfo packet sent at step S701, and determines whether the Reply packet is received. At step S702, if the CPU 202 determines that the Reply packet to the GetNetInfo packet is received (YES in step S702), the Reply packet is stored on the RAM 204.

At step S703, the CPU 202 confirms whether the network number of the temporary address determined at step S605 is within the range of the network number included in the Reply packet of the GetNetInfo. The protocol address of the APPLETALK network protocol includes a network number, a node ID, a socket number, etc. At step S703, if the CPU 202 determines that the network number of the temporary address is outside the range of the network number included in the Reply packet of the GetNetInfo (NO in step S703), the process flow proceeds to step S706.

At step S706, the CPU 202 change the temporary address so that the address determination sequence is carried out again using the network number indicated in the Reply packet of the GetNetInfo, and the processing is returned to step S601.

On the other hand, at step S702, if the CPU 202 determines that the Reply packet of the GetNetInfo packet sent at step S701 is not returned (NO in step S702), the process flow proceeds to step S704. At step S704, the CPU 202 determines/verified that no router exists, and sets the zone to default. Then the process flow proceeds to step S705.

Furthermore, at step S703, if the CPU 202 determines that the network number of the temporary address determined in step S605 is within the range of the network address included in the Reply packet of the GetNetInfo (YES in step S703), then the process flow proceeds to step S705.

Then, at step S705, the CPU 202 determines that the temporary address determined at step S605 is effective in the zone, the temporary address determined at step S605 is determined as an authorized address and operation is started. Then, the processing in this flowchart is completed. Based on the above flow of the processing, in the APPLETALK network protocol, the protocol address is determined.

FIG. 8 is a flowchart illustrating an example of a third control processing procedure in the network device, and FIG. 8 corresponds to the name resolution processing shown in step S503 in FIG. 5. The processing in the flowchart is realized when the CPU 202 shown in FIG. 2 reads the program stored on the HDD 207 onto the RAM 204 and carries out the read program.

In the address management module 1103, as shown in FIG. 5, the CPU 202 carries out the name resolution after the protocol address is determined. When the name resolution is carried out, at step S801, the CPU 202 sends an NBPLkUp packet which stores the name used by its own device on the network 100, and waits for a response from the other devices.

Then, at step S802, the CPU 202 determines whether a Reply packet of the NBPLkUp packet sent at step S801 has returned. At step S802, if the CPU 202 determines that the Reply packet of the NBPLkUp packet sent at step S801 has returned (YES in step S802), the CPU 202 stores the Reply packet on the RAM 204. In this case, the CPU 202 determines that the other device on the network is using the name in the NBPLkUp packet. Then, at step S803, because the name is overlapped, the CPU 202 changes the name, the processing is returned to step S801, and the name is confirmed again.

On the other hand, at step S802, if the CPU 202 determines that the Reply packet of the NBPLkUp packet sent at step S801 has not been returned (NO in step S802), the CPU 202 performs step S804. In this case, the CPU 202 determines that any device on the network is not using the name in the NBPLkUp packet. Then, at step S804, the CPU 202 determines/verifies that the name in the NBPLkUp packet sent at step S801 is an authorized address, the service is started, and the processing in this flowchart is completed. With the flow of processing as described above, the multifunction device 101 provides the printservice to the network using the APPLETALK network protocol.

In protocols in APPLETALK network protocol, it is necessary to monitor the router. Hereinafter, with reference to FIG. 9, a flow of an exemplary processing of updating the protocol address by monitoring the router is described.

Figure 9:
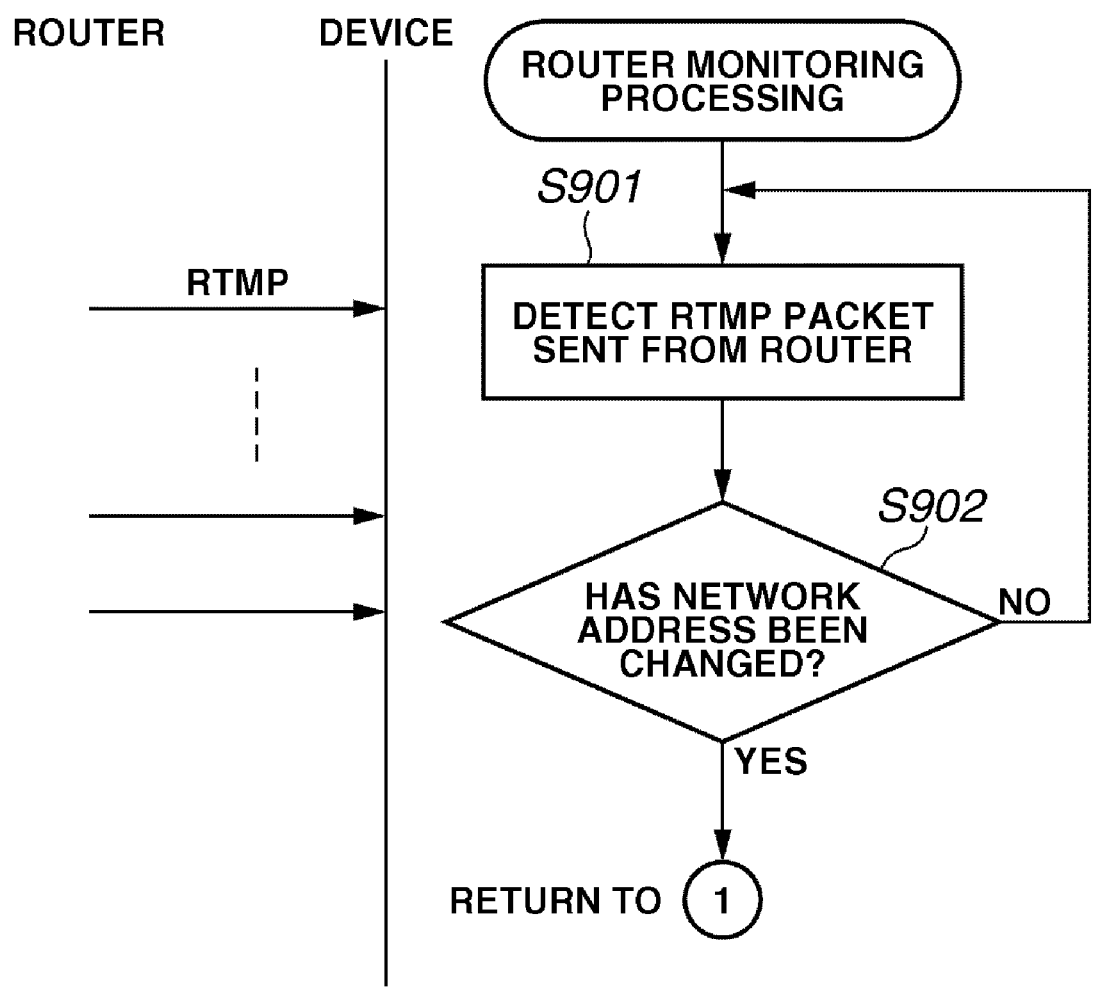
FIG. 9 is a flowchart illustrating an example of a fourth control processing procedure in the network device, according to an aspect of the present invention.

FIG. 9 is a flowchart illustrating an example of a fourth control processing procedure in the network device, and FIG. 9 corresponds to the flow of processing of updating the protocol address by monitoring the router. The processing in the flowchart is realized when the CPU 202 shown in FIG. 2 reads the program stored on the HDD 207 onto the RAM 204 and carries out the read program.

In the address management module 1103, at step S901, the CPU 202 monitors a RTMP packet from the router, and detects the RTMP packet from the router. The RTMP packet from the router is a packet regularly sent from a router (in this exemplary embodiment, PC 103). After the RTMP packet from the router has been detected, it is determined whether the network number (Network address) has been changed at step S902.

At step S902, based on the RTMP packet from the router detected at step S901, the CPU 202 determines whether the network number has been changed. If it is determined that the network number has not been changed (NO in step S902), the processing is returned to step S901 and the RTMP packet from the router is monitored. On the other hand, at step S902, if it is determined that the network number has been changed (YES in step S902), the sequence shown in FIG. 6 is carried out and the change (update) of the protocol address is carried out. Thus, while monitoring the state of the router, the device provides the network with the print service and waits for print data.

Figure 10:
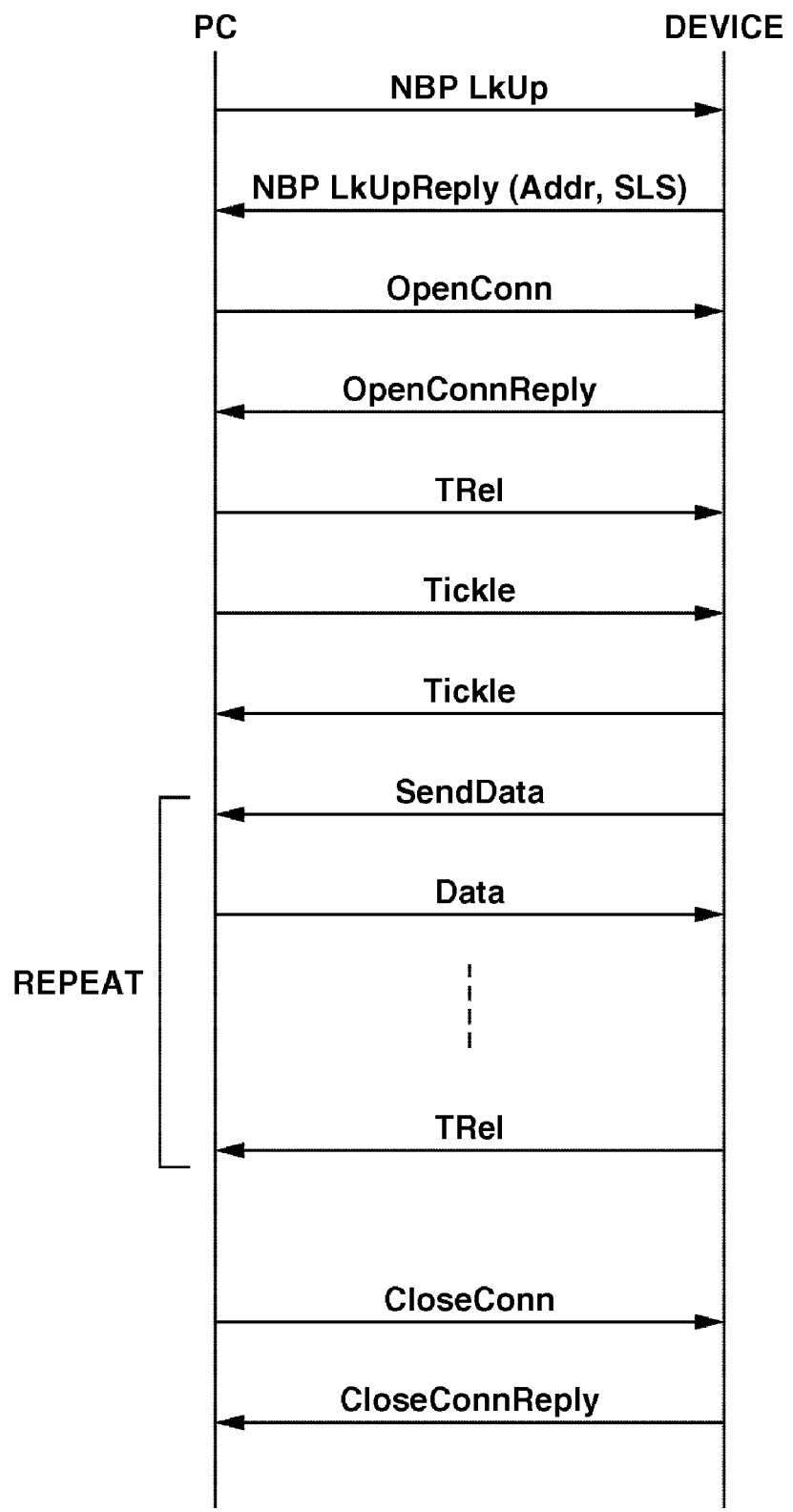
FIG. 10 is a timing chart illustrating a flow of printing using a general APPLETALK network protocol, according to an aspect of the present invention.

With reference to FIG. 10, a flow of printing using a typical APPLETALK network protocol is described. FIG. 10 is a timing chart illustrating a flow of printing using a typical APPLETALK network protocol. As shown in FIG. 10, from a PC which performs printing (hereinafter, simply referred to as PC), a NBPLkUp packet is sent and the name of the device which provides a print service (hereinafter, simply referred to as device) is monitored from the network. Then, the device returns a protocol address of the device and a number of a socket for printing (SLS) as the NBPLkUpReply.

The PC sends an OPENConn packet to the protocol address and the SLS returned by the NBPLkUpReply, and connection is generated. The device returns the response OpenConnReply to the PC and connection for printing is generated. Then, the device sends a SendData packet which indicates to the PC that data reception is ready. The PC receives the packet and sends print data (Data) to the device. The sequence is repeated until the print data runs out. When all the print data is sent, the PC sends a CloseConn packet to the device and the connection is completed. The device receives the packet and returns a response (CloseConnReply) to the PC.

With reference to FIG. 11, a module configuration in the multifunction device 101 shown in FIG. 1 is described. FIG. 11 is a schematic view illustrating an exemplary module configuration in the multifunction device 101 shown in FIG. 1.

In FIG. 11, reference numeral 1103 denotes an address management module (APPLETALK network protocol address management module). Reference numeral 1102 denotes a protocol stack module (APPLETALK network protocol stack module). Reference numeral 1101 denotes a print service module (APPLETALK network protocol print service module). Reference numeral 1104 denotes a power supply state monitoring module.

A packet received from the network is processed in the address management module 1103 and the protocol stack module 1102, and transferred to a printing module by the print service module 1101. Then, the packet is rasterized in the printing module as printable bitmap data, transferred to a printer engine, and printed.

The above is the flow of the processing of the print service in the APPLETALK network protocol. The power supply state monitoring module 1104 controls the address management module 1103 to stop when the process is entering the power-saving mode. Further, the power supply state monitoring module 1104 controls the address management module 1103 to start up when the process returns to the normal operation mode from the power-saving mode.

Figure 12:
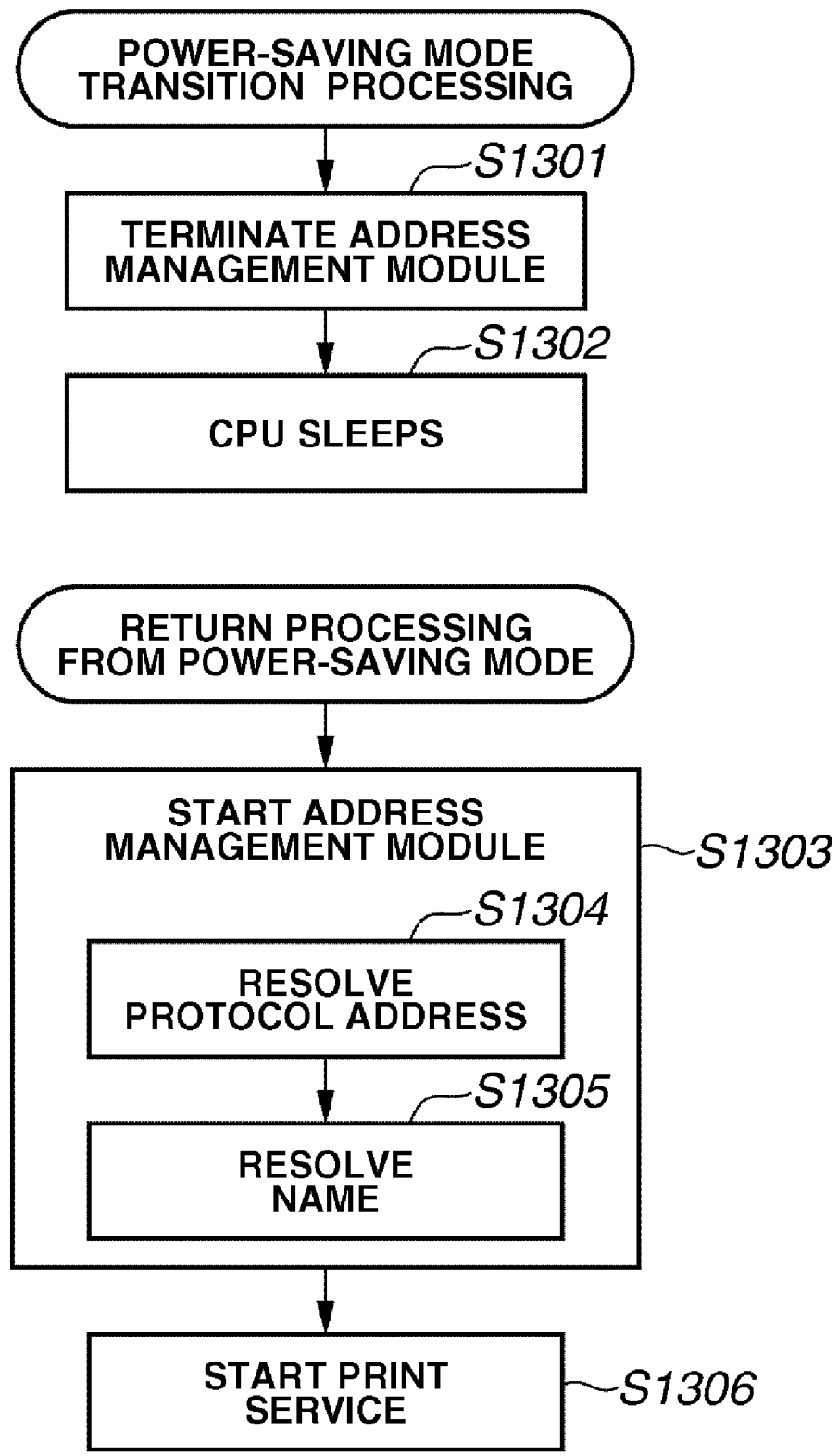
FIG. 12 is a flowchart illustrating an example of a fifth control processing procedure in the network device, according to an aspect of the present invention.

With reference to FIG. 12, general flow of processing according to the exemplary embodiment, that is, processing of entering the power-saving mode (power-saving state), and processing of returning from the power-saving mode to the normal operation mode (when the power-saving state is released) are described.

FIG. 12 is a flowchart illustrating an example of a fifth control processing procedure in the network device, and corresponds to the general flow of the processing of entering the power-saving mode, and the processing of returning from the power-saving mode to the normal operation mode. The processing in the flowchart is realized when the CPU 202 shown in FIG. 2 reads the program stored on the HDD 207 onto the RAM 204 and carries out the read program.

When the process enters the power-saving mode, in the power supply state monitoring module 1104, first, at a step (not shown), the CPU 202 stores control information such as a program counter of a task operating at the time, stack information, register information of the CPU 202 on the RAM 204. Further, the CPU 202 carries out termination processing of each device unit.

At step S1301, the CPU 202 stores information about the protocol address and name which are being used at the time on the RAM 204 and stops (terminates) the address management module 1103. Then, at step S1302, the CPU 202 performs control to stop the CPU 202 itself. That is, the CPU 202 instructs the power supply control unit 215 to shut off the power supply to the area 301 shown in FIG. 3 including the CPU 202.

When the process returns from the power-saving mode, the power supply control unit 215 energizes the area surrounded by reference numeral 301 (which includes CPU 202) shown in FIG. 3. The energized CPU 202, when it returns from the power-saving mode (when the power-saving state is released), carries out an initialization processing of each device unit in the power supply state monitoring module 1104 at a step (not shown).

Then, at step S1303, the CPU 202 starts the address management module 1103. At step S1304, the address management module 1103 reads the protocol address which was used before entering the power-saving mode stored on the RAM 204 and resolves the protocol address (address resolution process at the time of returning from the power-saving mode) at S1305. Then, at step S1306, the CPU 202 starts the print service.

Here, the process at the time of returning from the power-saving mode and the flow of the start-up process at the start time of starting shown in FIG. 5 are compared. In the process at the time of returning from the power-saving mode, after the address management module 1103 is started, the start processing of the protocol stack module 1102 (S504 in FIG. 5) and the start processing of the print service module 1101 (S505 in FIG. 5) can be omitted. The method for realizing the omission is described in detail below.

Figure 13:
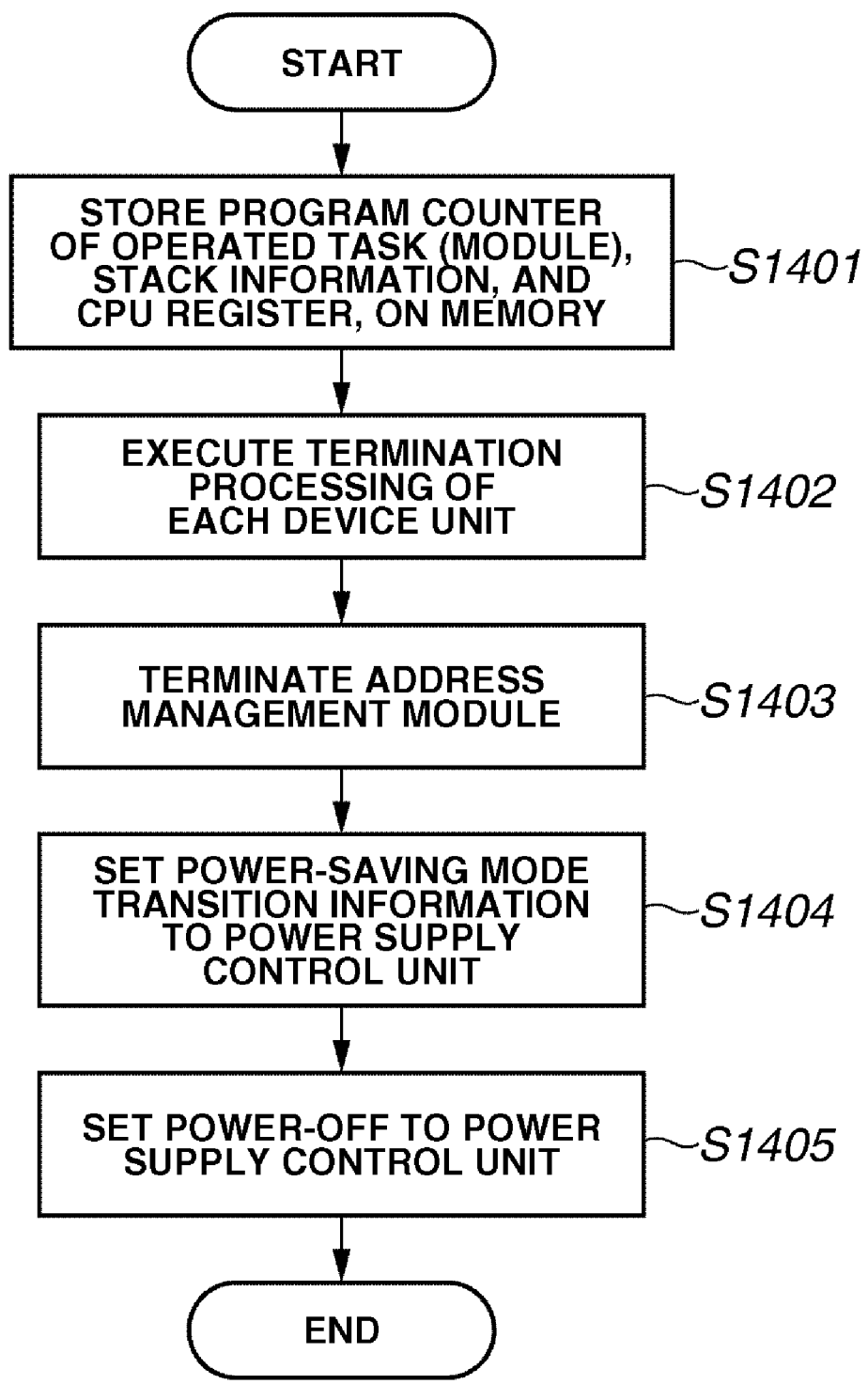
FIG. 13 is a flowchart illustrating an example of a sixth control processing procedure in the network device, according to an aspect of the present invention.
Figure 14:
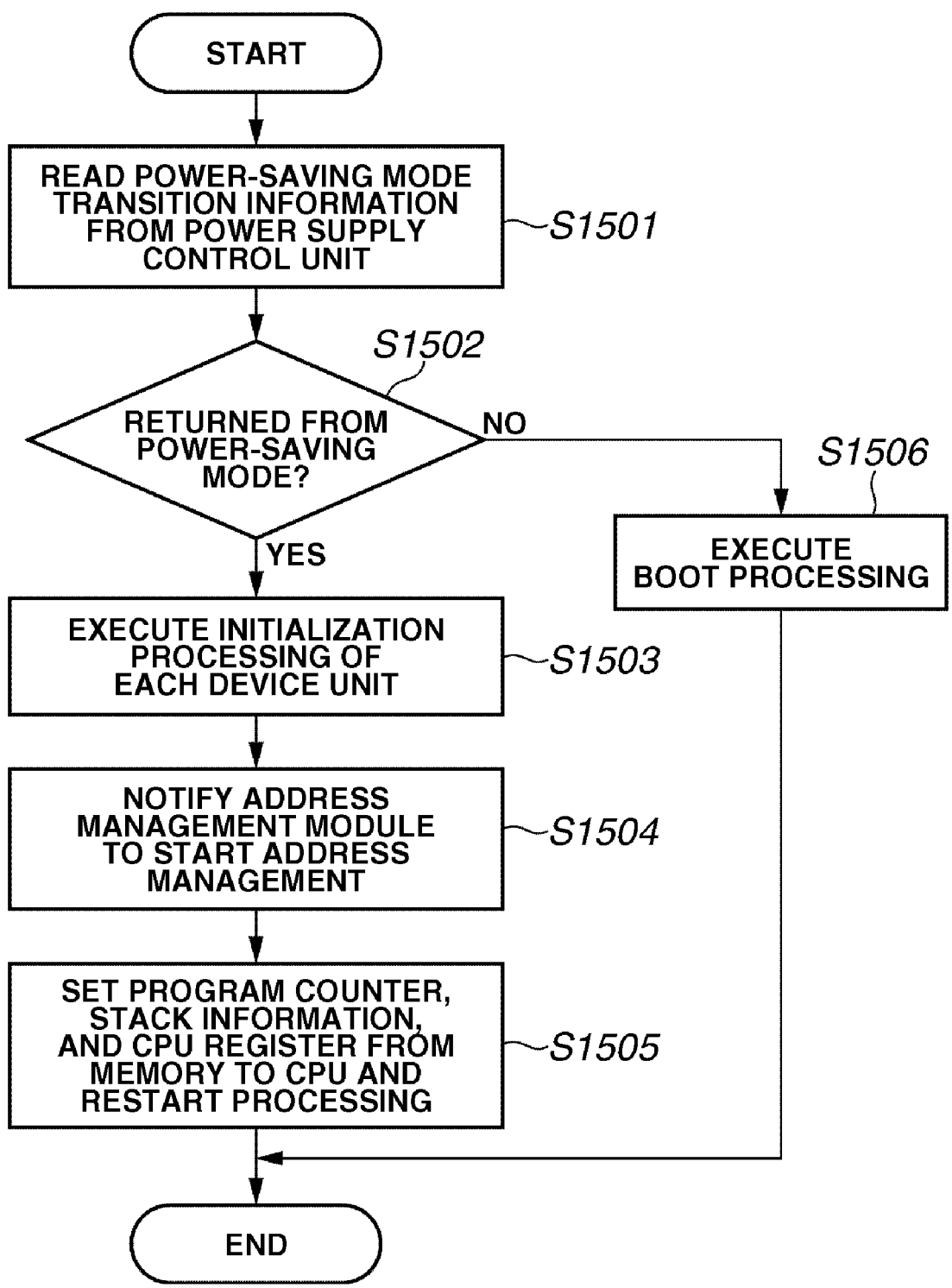
FIG. 14 is a flowchart illustrating an example of a seventh control processing procedure in the network device, according to an aspect of the present invention.

With reference to FIGS. 13 and 14, differences among processing at the time of entering the power-saving mode, processing at the time of returning from the power-saving mode, and processing at the time of power activation in the multifunction device 101 are described.

FIG. 13 is a flowchart illustrating an example of a sixth control processing procedure in the network device, and corresponds to the processing at the time of entering the power-saving mode in the device according to the present exemplary embodiment. The processing in the flowchart is realized when the CPU 202 shown in FIG. 2 reads the program stored on the HDD 207 onto the RAM 204 and carries out the read program.

The multifunction device 101 enters the power-saving mode when the user depresses the ON/OFF button 405 on the user interface part 214 shown in FIG. 4 or when no job is sent for a given length of time. Then, at step S1401, in the poser supply state monitoring module 1104, the CPU 202 stores on the RAM 204 (not shown in FIG. 12) control information such as a program counter of a task (module) operating at the time, stack information, register information of the CPU 202. The information is used when the process returns (restart) from the power-saving mode to the processing operated at the time the process enters the power-saving mode.

At step 1402, the CPU 202 carries out termination processing of each device unit such as the HDD 207, the scanner engine control unit 201, or the engine control unit 206 (not shown in FIG. 12). Then, the I/O control unit 209 darkens a screen on the touch panel 401, notifies the user that the mode is the power-saving mode, and controls only the ON/OFF button 405 to be effective. Then, at step S1403, the CPU 202 stores on the RAM 204 information about the protocol address and name which are being used at the time and stops the address management module 1103 (which corresponds to step S1301 in FIG. 12).

At step S1404, the CPU 202 sets the power-saving mode enter information to the power supply control unit 215 so that it is noted to be a return from the power-saving mode when the CPU 202 is started next time. Thus, the power supply control unit 215 stores the power-saving mode enter information on an internal storage device (not shown). At step S1405, the CPU 202 sets (instructs) the power supply control unit 215 to shut off the power supply. The above steps S1404 and S1405 correspond to step S1302 in FIG. 12.

When the power supply control unit 215 accepts the request to shut off power supply, the power supply control unit 215 shuts off power supply to all units in the area 301 in FIG. 3. Thus, the power supply to the CPU 202 is also shut off, and the low power consumption is realized. As shown in FIG. 3, the programs, information related to the CPU, and information about the protocol address and name stored on the RAM 204 are retained as return information because even if the power supply to the area 301 is shut off, the RAM 204 is still energized. Accordingly, when the process returns from the power-saving mode, by using the information retained on the RAM 204, the CPU 202 can operate from the program which operated just before entering the power-saving mode.

Next, processing at the time of power supply to the CPU 202 is described. With respect to power supply provided to the CPU 202, there are two main cases. One case is when the process returns from the power-saving mode, and another case is when the main power supply is turned on.

When the process returns from the power-saving mode, if the user depresses the ON/OFF button 405 shown in FIG. 4 or if the network control unit 210 receives a packet including a start-up request from the network, the multifunction device 101 returns from the power-saving mode.

First, when the user depresses the ON/OFF button 405, a PowerOn signal 302 is sent to the power supply control unit 215 through the I/O control unit 209. The power supply control unit 215 receives the PowerOn signal 302, supplies power to all units in the area 301 shown in FIG. 3, and returns the multifunction device 101 from the power-saving mode. Thus, the CPU 202 enters an operating condition.

Similarly, when a packet including a start-up request is received from the network, the PowerOn signal 302 is sent from the network control unit 210 to the power supply control unit 215. The power supply control unit 215 receives the PowerOn signal 302, supplies power to all units in the area 301 shown in FIG. 3, and the multifunction device 101 returns from the power-saving mode. Thus, the CPU 202 enters the operating condition.

When the CPU 202 is energized, the CPU 202 carries out the processing according to a program registered on a predetermined area (an area corresponding to an activation vector) of the RAM 204. A flow of the exemplary processing of the program is shown in FIG. 14.

FIG. 14 is a flowchart illustrating an example of a seventh control processing procedure in the network device, and corresponds to the processing at the time of supplying power to the devices according to the present exemplary embodiment. The processing in the flowchart is realized when the CPU 202 shown in FIG. 2 reads the program stored on the HDD 207 onto the RAM 204 and carries out the read program.

First, at step S1501, the CPU 202 reads power-saving mode enter information of the power supply control unit 215 (not shown in FIG. 12). At step S1502, depending on whether the power-saving mode enter information exists in the power supply control unit 215, the CPU 202 determines whether it should return from the power-saving mode (whether it has been in the power-saving mode) (not shown in FIG. 12).

If the CPU 202 determines that the power-saving mode enter information exists in the power supply control unit 215, the CPU 202 determines that it is the return from the power-saving mode (it has been in the power-saving mode). On the other hand, if the CPU 202 determines that the power-saving mode enter information does not exist in the power supply control unit 215, the CPU 202 determines that it is not the return from the power-saving mode (it has not been in the power-saving mode), that is, it is the return from the main power supply OFF.

At step S1502, if the CPU 202 determines that it has not been in the power-saving mode (i.e., return from the main power supply OFF) (NO in step S1502), at step S1506, the CPU 202 carries out a boot processing in order to carry out a normal start-up processing (not shown in FIG. 12). Then, the processing in the flowchart is completed. More specifically, in the boot processing, the HDD 207 is initialized, and the execution program is read from the HDD 207. The program is expanded on the RAM 204, each module is carried out according to the program, and the service is provided.

On the other hand, at step S1502, if the CPU 202 determines that it has been in the power-saving mode, that is, when the process returns from the power-saving mode (YES in step S1502), at step S1503, the CPU 202 carries out an initialization processing of each unit. Then, the I/O control unit 209 displays the touch panel screen 401 and notifies the user that the mode has returned from the power-saving mode to the normal mode (not shown in FIG. 12).

Then, at step S1504, the CPU 202 starts the address management module 1102 of the APPLETALK network protocol and notifies the start of the address management (which corresponds to the step S1303 in FIG. 12). Thus, processing shown in FIGS. 15 and 16 described below is carried out.

Then, at step S1505, the CPU 202 perform control (control to return) to return to itself the control information such as the program counter, stack information, register information of the CPU retained on the RAM 204, and restart the program from the state existent before entering power-saving mode. Then, the processing in the flowchart is completed. Thus, the print service is restarted (which corresponds to step S1306 in FIG. 12).

As described above, because the RAM 204 is energized during the power-saving mode, the data expanded on the memory such as the protocol address, name, or program is retained during the power-saving mode.

Figure 15:
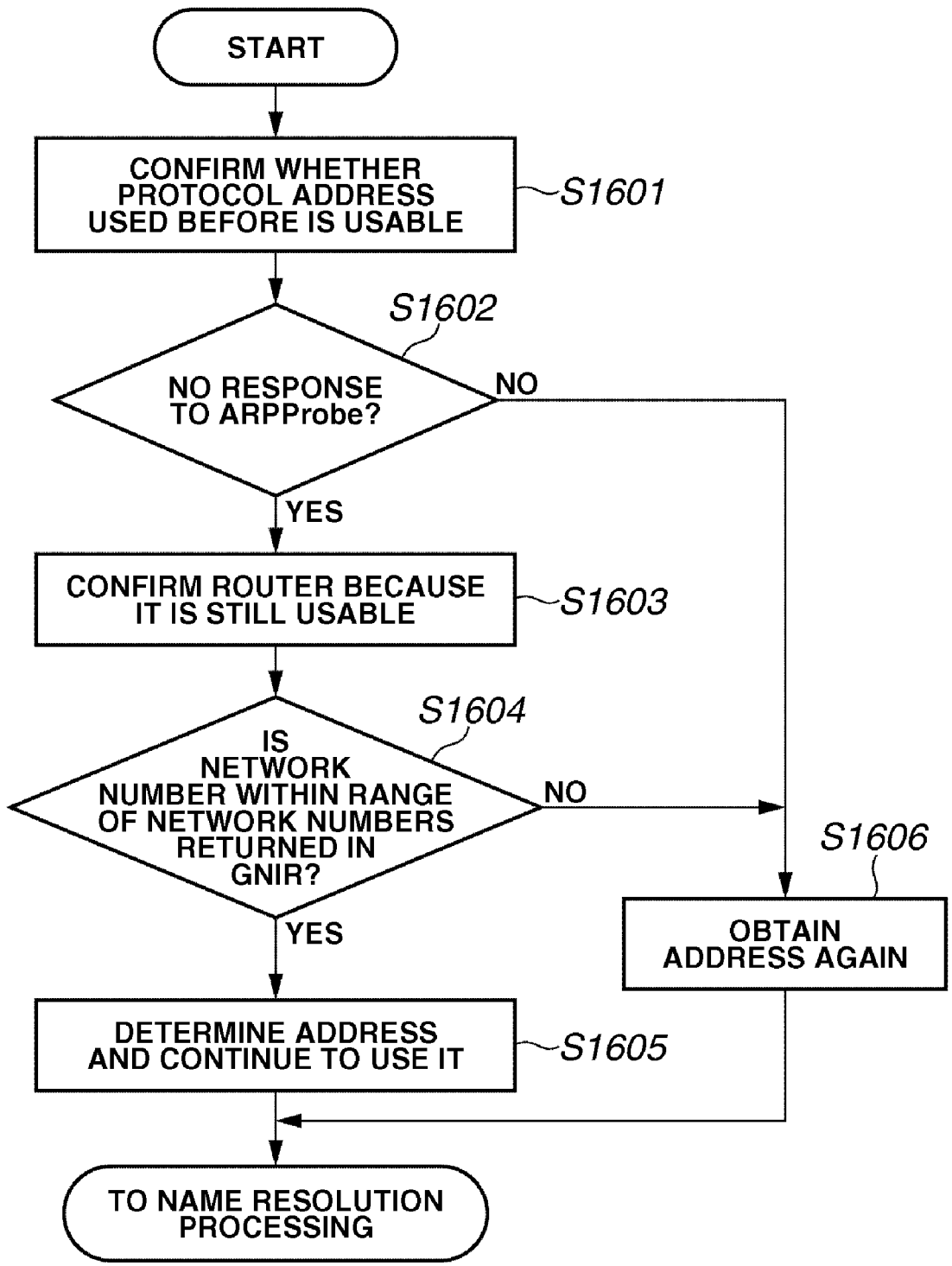
FIG. 15 is a flowchart illustrating an example of an eighth control processing procedure in the network device, according to an aspect of the present invention.
Figure 16:
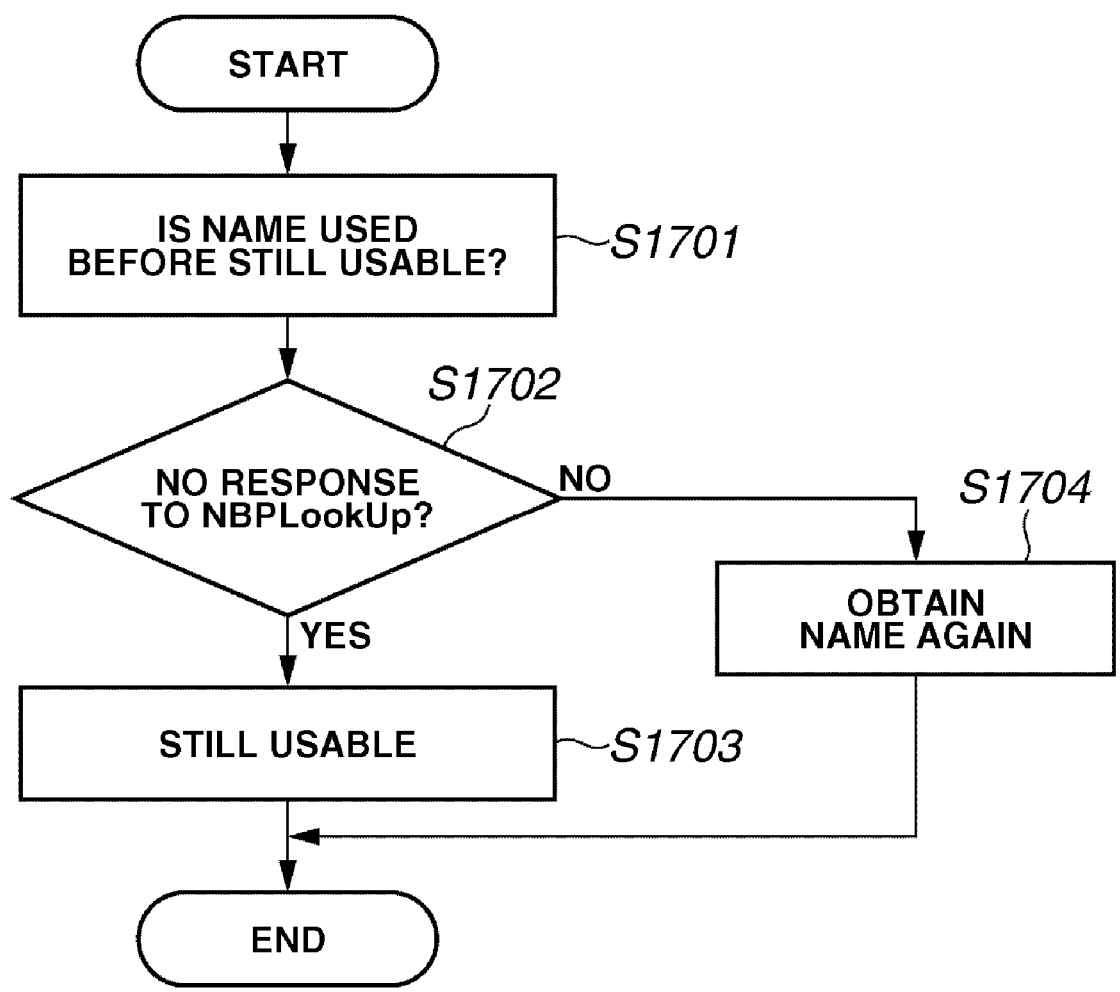
FIG. 16 is a flowchart illustrating an example of a ninth control processing procedure in the network device, according to an aspect of the present invention.

With reference to FIGS. 15 and 16, exemplary flows of address resolution processing, and name solution processing at the time of returning from the power-saving mode are described.

FIG. 15 is a flowchart illustrating an example of a eighth control processing procedure in the network device, and corresponds to the address resolution processing at the time the device returns from the power-saving mode (step S1304 in FIG. 12) according to the present exemplary embodiment. The processing in the flowchart is realized when the CPU 202 shown in FIG. 2 reads the program stored on the HDD 207 onto the RAM 204 and carries out the read program.

At step S1504 in FIG. 14, when the start of the address management is notified to the address management module 1103, in the address management module 1103, the CPU 202 starts processing of the flowchart. In the processing, the CPU 202 determines whether the protocol address which was retained while the mode is the power-saving mode is still usable and whether the name is still usable. If it is determined that the protocol address and the name are still usable, the protocol address and the name are continued to be used.

When the process returns from the power-saving mode, first, at step S1601, the CPU 202 reads from the RAM 204 the protocol address used before entering the power-saving mode. Then, the CPU 202 confirms whether the protocol address used before entering the power-saving mode is still usable by sending an ARPProbe packet to the network. The CPU 202 confirms according to the existence of the response of the ARPProbe packet whether the protocol address which was used by the device is used by the other PC after the CPU 202 entered the power-saving mode.

At step S1602, the CPU 202 determines whether there is a response (AARPReply) in the ARPProbe packet. If it is determined that the response does not exist in the ARPProbe packet (YES in step S1602), the processing proceeds to step S1603. In this case, the CPU 202 determines that any device does not use the protocol address. Then, at step S1603, the CPU 202 sends a GNI (GetNetInfo) packet in order to determine whether to continue to use the protocol address, and confirms the information on the router.

The CPU 202 determines whether the information in the router has been changed during the power-saving mode. The CPU 202 waits for a Reply packet of the GetNetInfo packet and according to the Reply packet of the GetNetInfo packet, confirms the network number. Then, at step S1604, the CPU 202 determines whether the network number of the address which was used before entering the power-saving mode is within a range of the network number included in the Reply packet of the GetNetInfo.

At step S1604, if the CPU 202 determines that the network number of the address which was used before entering the power-saving mode is within the range of the network number included in the Reply packet of the GetNetInfo (YES in step S1604), at step S1605, the CPU 202 determines to continue to use the protocol address which was used before entering the power-saving mode, and the processing in the flowchart is completed. Then, the processing enters the name resolution processing at the time of returning from the power-saving mode shown in FIG. 16.

At step S1604, if the CPU 202 determines that the network number of the address which was used before entering the power-saving mode is not within the range of the network number included in the Reply packet of the GetNetInfo (which includes a case in which the reply of the GetNetInfo packet has not been received) (NO in step S1604), the processing proceeds to step S1606.

Also, it at step S1602, the CPU 202 determines that there is the response (AARPReply) in the ARPProbe packet (NO in step S1602), the processing also proceeds to step S1606. At step S1606, the CPU 202 performs control so as to obtain an address again (which is similar processing shown in FIGS. 6 and 7). After obtaining the address, the processing in the flowchart is completed. Then, the processing enters the name resolution processing to be executed at the time of returning from the power-saving mode shown in FIG. 16.

FIG. 16 is a flowchart illustrating an example of a ninth control processing procedure in the network device, and corresponds to the name resolution processing at the time the device returns from the power-saving mode (step S1305 in FIG. 12) according to the present exemplary embodiment. The processing in the flowchart is realized when the CPU 202 shown in FIG. 2 reads the program stored on the HDD 207 onto the RAM 204 and carries out the read program.

After the address is determined in the processing shown in FIG. 15, processing in the flowchart is started. First, at step S1701, the CPU 202 reads the name which was used before entering the power-saving mode from the RAM 204. Then, the CPU 202 sends a NBPLkUp packet to the network to confirm whether the name which was used before entering the power-saving mode is still usable.

At step S1702, the CPU 202 determines whether there is a response (NBPLkUpReply) in the NBPLkUp packet. At step S1702, if the CPU 202 determines that there is not the response (NBPLkUpReply) in the NBPLkUp packet (YES in step S1702), the processing proceeds to step S1703. In this case, the CPU 202 determines that the same name was not used while the mode was the power-saving mode, and at step S1703, the CPU 202 determines to continue to use the name which was used before entering the power-saving mode. Then, the processing in the flowchart is completed.

On the other hand, at step S1702, if CPU 202 determines that there is the response (NBPLkUpReply) in the NBPLkUp packet (NO in step S1702), the processing proceeds to step S1704. In this case, the CPU 202 determines that the same name was used during the power-saving mode, and at step S1704, the CPU 202 performs control to obtain a name again (similar processing shown in FIG. 8) and the name is obtained. Then, the processing in the flowchart is completed.

As described above, the case can be dealt with in which the protocol address or the name has been used by another device while the power supply to the CPU is shut off (during the power-saving mode). After the process returns from the power-saving mode, the protocol stack module and the print service module are expanded on the RAM 204 in the same state as the state before entering the power-saving mode, and still operable as programs. Accordingly, by starting only the address management module 1103, after returning from the power-saving mode, it is possible to provide the print service of the APPLETALK network protocol.

Next, overall processing according to the exemplary embodiment is described below. First, processing from turning-on of the power supply to the printing is described. When the main power supply of the device is turned on, as shown by the flow in FIG. 14, the CPU 202 carries out the start-up processing. In the case where the main power supply of the device is turned on, a determination is made at step S1502, and the boot processing is carried out. After the boot processing, the program is expanded, and each service can be carried out.

In the print service of the APPLETALK network protocol, as shown in FIG. 5, the address management module 1103 is started and in the address management module, the protocol address resolution processing and the name resolution processing are carried out. The processing is realized in the flow of the processing described in FIGS. 6 and 7.

After that processing, the address management module 1103 carries out the name resolution processing according to the flow of the processing described in FIG. 8. When the protocol stack module 1102 and the print service module 1101 are started, the device can start the print service of the APPLETALK network protocol. While the print service is provided, the address management module 1103 monitors packets sent from the router according to the flow of the processing shown in FIG. 9.

If a print request is issued from the PC, according to the flow of the processing shown in FIG. 10, the print service module 1101 receives data from the PC, transfers the print data to the printing module and the printing is carried out. Typically, according to the flow of such processing, printing from the APPLETALK network protocol is carried out.

Next an exemplary flow of overall processing when the mode is the power-saving mode and then returned from the power-saving mode, is described.

If any copying or print job is not generated for a given period of time, or the user turns on the power-saving mode from the ON/OFF button 405 on the panel, the device enters the power-saving mode. The flow of the processing at the time is such that, as shown in steps S1301 and S1302 in FIG. 12, the power supply state monitoring module 1104 carries out the processing of entering the power-saving mode, performs the suspend processing to the address management module 1103 and stops the CPU 202. The detailed processing is shown in FIG. 13. When the address management module 1103 accepts the stop request from the power supply state monitoring module 1104, it stops the monitoring (update processing of the protocol address) of the router. Accordingly, while the power supply to the CPU 202 is shut off (in the state of the power-saving mode), the protocol address or the name which was used by the multifunction device 101 can be used by other devices.

Figure 17:
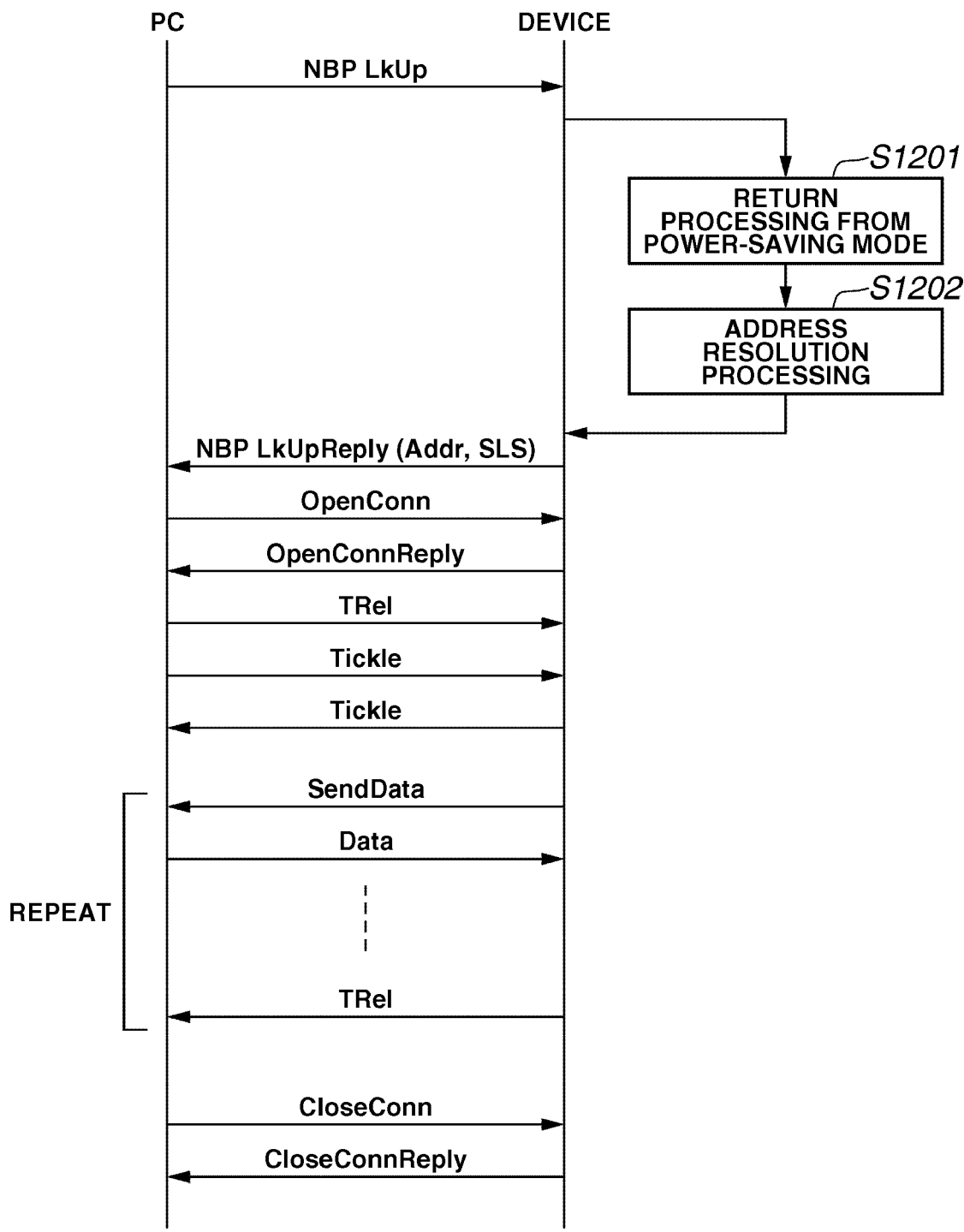
FIG. 17 is a timing chart illustrating an exemplary flow of processing when a print request of the APPLETALK network protocol is sent from a PC when the device is in the power-saving mode, according to an aspect of the present invention.

With reference to FIG. 17, flow of processing when a print request of the APPLETALK network protocol_is issued in the state of the power-saving mode, is described below. FIG. 17 is a timing chart illustrating a flow of exemplary processing when a print request of the APPLETALK network protocol is issued from the PC.

As shown in FIG. 17, since the network control unit 210 is energized even in the state of the power-saving mode, in the network control unit 210, it is possible to receive a network packet. The network control unit 210 is set in advance to send a PowerOn signal 302 to the power supply control unit 215 when a packet of a predetermined format is received. According to the present embodiment, the network control unit 210 is set to send a PowerOn signal 302 to the power supply control unit 215 when the NBPLkUp packet is received. If the device is set to return from the power-saving mode by an APPLETALK network protocol_packet other than the above-described packet, the device is frequently started by an APPLETALK network protocol packet unrelated to the device on the network. Accordingly, the network control unit 210 is set to send the PowerOn signal 302 to the power supply control unit 215 only in the pattern of the NBPLkUp packet.

Thus, when the network control unit 210 receives the NBPLkUp packet, the network control unit 210 sends the PowerOn signal 302 to the power supply control unit 215. The power supply control unit 215 which received the PowerOn signal 302 turns on power supply of each unit in the area 301 shown in FIG. 3 and the processing 1201 of returning from the power-saving mode is carried out in the flow of processing shown in FIG. 14. In step S1502 in FIG. 14, if it is determined that the mode is returned from the power-saving mode, the initialization processing of each device is carried out, and the address management module 1103 is notified of the start of the address management. Then, the program counter is returned from the RAM 204 by the CPU 202, and it becomes possible to restart the processing from the program counter which is stopped when the process enters the power-saving mode.

When the address management module 1103 starts the processing, an address resolution processing 1202 is carried out. The address resolution processing 1202 is carried out in the processing shown in FIGS. 15 and 16. It is determined whether the protocol address and name which have been used are still usable, and a continuation processing is carried out.

After the protocol address and the name are confirmed again, the device sends a NBPLkUpReply packet to the PC. Even if the protocol address has been changed during the power-saving mode, by returning a new protocol address to the NBPLkUpReply packet, the PC generates connection and it is possible to make a print after that.

Thus, when the process enters the power-saving mode, the address management module 1103 is stopped. When the process returns from the power-saving mode, the address management module 1103 is operated and the protocol address is resolved. Accordingly, under the condition of the power-saving mode in which the power supply of the CPU is shut down, it is possible to provide the service of the APPLETALK network protocol.

As described above, according to the present exemplary embodiment, when the process returns from the power-saving mode, even if the service of the APPLETALK network protocol is effective, it is possible to enter the power-saving mode while the CPU is stopped.

Second Exemplary Embodiment

Figure 18:
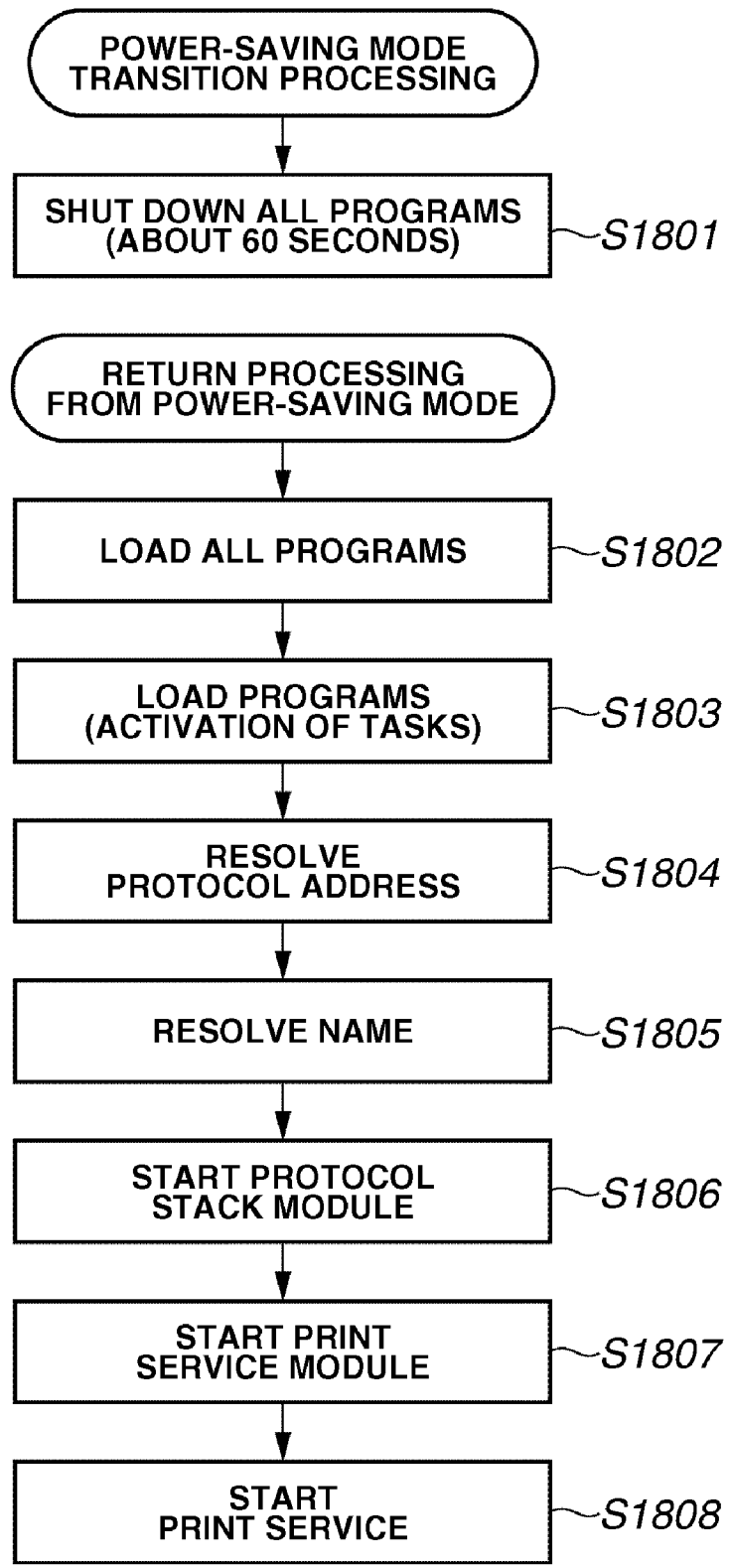
FIG. 18 is a flowchart illustrating an example of a tenth control processing procedure in the network device, according to an aspect of the present invention.

Other than the above-described first exemplary embodiment, it is possible to deal with the subject by realizing a sequence described below. With reference to FIG. 18, the second exemplary embodiment is described.

FIG. 18 is a flowchart illustrating an example of a tenth control processing procedure in the network device. FIG. 18 corresponds to the processing when the device enters the power-saving mode, and the processing when the device returns from the power-saving mode according to the second exemplary embodiment. The processing in the flowchart is realized when the CPU 202 shown in FIG. 2 reads the program stored on the HDD 207 onto the RAM 204 and carries out the read program.

First, when the process enters the power-saving mode, at step S1801, the CPU 202 terminates (shut down) all operating programs. Then, when the process returns from the power-saving mode, at step S1802, the CPU 202 reloads all programs and at step S1803, the programs are sequentially activated. Then, at step S1804, the CPU 202 carries out processing for resolving the protocol address, and at step S1805, carries out processing for resolving the name. Further, at step S1806, the CPU 202 starts the protocol stack module 1102 and at step S1807, the print service module 1101 is started. Then, at step S1808, the CPU 202 starts the print service.

It should be noted that, if such a sequence is carried out, when the process enters the power-saving mode, all of the operating programs are terminated. Accordingly, as compared with the sequence described in the first exemplary embodiment, it takes more time to enter the power-saving mode. Further, when the process returns from the power-saving mode, all programs are reloaded. Accordingly, as compared with the sequence described in the first exemplary embodiment, it also takes more time to return from the power-saving mode.

Third Exemplary Embodiment

Figure 19:
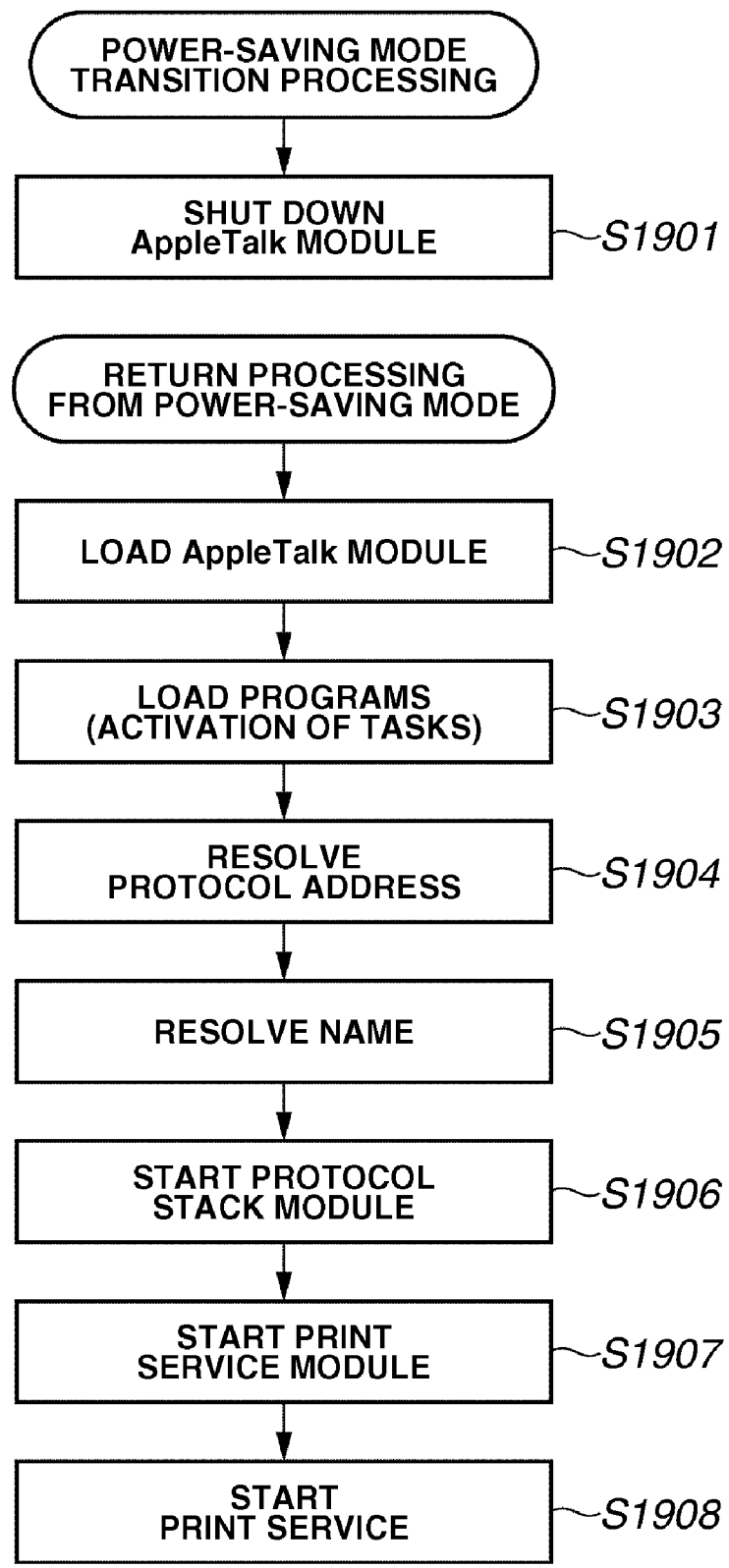
FIG. 19 is a flowchart illustrating an example of a eleventh control processing procedure in the network device, according to an aspect of the present invention.

As another exemplary embodiment, it is possible to deal with the subject by realizing a sequence described below. With reference to FIG. 19, the third exemplary embodiment is described.

FIG. 19 is a flowchart illustrating an example of an eleventh control processing procedure in the network device, and corresponds to processing when the device enters the power-saving mode, and processing when the device returns from the power-saving mode according to the third exemplary embodiment. The processing in the flowchart is realized when the CPU 202 shown in FIG. 2 reads the program stored on the HDD 207 onto the RAM 204 and carries out the read program.

First, when the process enters the power-saving mode, at step S1901, the CPU 202 terminates (Shut Down) only APPLETALK network protocol related modules 1101 to 1103 which are operating. When the process returns from the power-saving mode, at step S1902, the CPU 202 reloads only the APPLETALK network protocol related modules, and at step S1903, the programs are sequentially activated. Then, at step S1904, the CPU 202 carries out processing for resolving the protocol address and at step S1905, carried out processing for resolving the name. Further, at step S1906, the CPU 202 starts the protocol stack module 1102 and at step S1907, starts the print service module 1101. Then, at step S1908, the CPU 202 starts the print service.

If such a sequence is carried out, when the process enters the power-saving mode, only the APPLETALK network protocol related modules 1101 to 1103 are terminated. Accordingly, as compared with the sequence described in the second exemplary embodiment (FIG. 18), the time necessary for entering the power-saving mode is shorter. Further, when the process returns from the power-saving mode, only the APPLETALK network protocol related modules 1101 to 1103 are reloaded. Accordingly, as compared with the sequence described in the second exemplary embodiment (FIG. 18), the time necessary for returning from the power-saving mode also becomes shorter.

As compared with the sequences described in the second and third exemplary embodiments (FIGS. 18 and 19), according to the sequence described in the first exemplary embodiment, time necessary for entering the power-saving mode and for return from the power-saving mode is significantly reduced. At the same time, even under the condition in which an dynamic protocol such as the APPLETALK network protocol is used, it is possible to enter the power-saving mode in which the power supply to the CPU is shut down.

Fourth Exemplary Embodiment

Similar to the protocol address of the APPLETALK network protocol described in the first, second, and third exemplary embodiments of the present invention, with respect to an IP address of the TCP/IP, an address management can be carried out with a same sequence.

In the case of the IP address of the TCP/IP, in recent years, a dynamic IP address acquisition using the DHCP has been used. In the DHCP, after a device acquires an IP address from a server, it is regularly queried to the server whether it is possible to continue to use the IP address.

In the present exemplary embodiment, the address management module is configured to support a DHCP protocol. That is, when the process enters the power-saving mode, the IP address used at the time is stored on the RAM 204. During power-saving mode, the query to the server is not performed. When the process returns from the power-saving mode, it is queried to the DHCP server whether the IP address (retained on the RAM 204) which was used before entering the power-saving mode is still usable. By this configuration, even in a case of a protocol in which an IP address such as the DHCP can be dynamically changed, similar to the case of the APPLETALK network protocol, it is possible to enter the power-saving mode in which the CPU is stopped. Further, when the process returns from the power-saving mode, operation can be performed without any problem.

Further, in a case of a protocol other than the APPLETALK network protocol_or the TCP/IP in which a protocol address can be dynamically changed, it is similarly possible to enter the power-saving mode in which the CPU is stopped. In addition, when the process returns from the power-saving mode, operation can be performed without any problem.

In each exemplary embodiment above-described, the multifunction device is used as an example. However, the present invention can be applied to any device if the device is a network device which is communicatable through a network by using a dynamic protocol address corresponding to a predetermined communication protocol.

While the present invention has been described with reference to the above exemplary embodiments, the present invention can be applied also to other embodiments, for example, a system, a device, a method, a program, or a storage medium.

More specifically, the present invention can be applied either to a system composed of a plurality of devices or an apparatus composed of a device.

As described above, the CPU 202 stores on the RAM 204 the address being used at the time the process enters the power-saving state (power-saving mode). Further, the CPU 202, when the power-saving mode is released, determines whether the address stored on the RAM 204 is usable. Then, if the address is usable, the CPU 202 performs control so that processing is restarted using the address. Thus, even in the case of a network device which operates in the condition in which an address can be dynamically changed such as the APPLETALK network protocol, TCP/IP, or DHCP, it is possible to enter the power-saving mode in which power supply to the CPU is shut off to save the power.

FIG. 20 is a view illustrating an exemplary memory map of a storage medium (recording medium) for storing various data processing programs readable by the network device according to an exemplary embodiments of the present invention.

Although not particularly illustrated, information which manages a program group stored on a storage medium, for example, version information, a name of writer can be stored, and information depending on an OS at the program reading side, for example, an icon which displays identification of a program, can be stored.

Further, data depending on various programs is managed in the above directory. Further, a program for installing various programs on a computer or, if a installing program is compressed, a program for decompressing the compressed program can be stored.

It is further noted that the functions shown in FIGS. 5 to 9, 12 to 16, and 18 to 19 can be carried out by a program externally installed by a computer. In this case, the present invention can be also applied where information group which includes a program is provided to an output device from an external recording medium through a network or, from a recording medium such as a CD-ROM, a flash memory, or a FD.

As described above, the recording medium which stores the program code of the software which realizes the functions described in the exemplary embodiments, is provided to a system or a device. Then, the present invention can be also achieved where a computer (or CPU or MPU) in the system or the device reads the program code stored on the recording medium and carries out the program.

In this case, the program code read from the recording medium itself realizes the novel function according to the present invention, and the recording medium which stores the program code constitutes the present invention.

Accordingly, if the function of the program is realized, any type of program such as a program carried out by an object code or an interpreter, script data provided to an OS can be used.

As an recording medium for supplying the program, for example, a flexible disk, a hard disk, an optical disk, a magneto-optical disk, a MO, a CD-ROM, a CD-R, a CD-RW, a magnetic tape, a nonvolatile memory card, a ROM, or a DVD can be used.

In this case, the program code read from the recording medium itself realizes the functions described in the above exemplary embodiments, and the recording medium which stores the program code constitutes the present invention.

In addition to the above, as an method of providing the program, a method of connecting to a website on the Internet by using an browser of a client computer, and downloading the program itself directed to the present invention from the website onto a recording medium such as a hard disk can be considered. Further, it can be possible to provide the program by downloading a compressed file which includes an automatic install function, from the website onto a recording medium such as a hard disk. Moreover, it can be possible to provide the program by dividing the program code which constitutes the program according to the present invention, into a plurality of files and downloading each divided file from different websites. That is, WWW servers or FTP servers which allow a plurality of users to download the program file for realizing the functional processing according to the present invention in a computer are included in the claims of the present invention.

The programs according to the present invention can be encrypted and stored on a storage medium such as a CD-ROM and can be distributed to users. Users who satisfied predetermined conditions are allowed to download information about a key to decrypt the programs from a website through the Internet. Then, the encrypted program can be executed using the key information and installed on a computer, and the invention is realized.

By executing the program code read by the computer, not only the functions according to the above-described exemplary embodiments are realized, but configurations described below are also included. For example, according to the instructions of the program code, an OS (operating system) operating on a computer performs a part or all of the actual processing, and by such processing, the functions according to the above-described exemplary embodiments can be realized.

Further, the program cord read from the recording medium is written on a memory provided to a function enhancement board inserted into the computer or a function enhancement unit connected to the computer. Then, according to the instruction of the program code written on the memory, a CPU provided to the function enhancement board or the function enhancement unit performs the a part or all of the actual processing, and by such processing, the functions according to the above-described exemplary embodiments can be realized.

Further, the present invention can be applied to a system composed of a plurality of devices or an apparatus composed of a device. Further, the present invention can be applied to a case in which the present invention is achieved by providing the program to a system or a device. In this case, the system or the device can benefit from the effects of the present invention by reading from the recording medium which stores the program described by software for achieving the present invention, onto the system or the device.

As described above, when the process returns from the power-saving mode, only the address resolution module of the APPLETALK network protocol is dealt with. Accordingly, even if the service of the APPLETALK network protocol is effective, it is possible to terminate the CPU and enter the power-saving mode.

Further, in the case of a protocol such as the DHCP in which an IP address can be dynamically changed, it is similarly possible to terminate the CPU and enter the power-saving mode.

Accordingly, even in the power-saving mode condition in which the CPU is stopped, in a protocol which uses an dynamic address such as the APPLETALK network protocol or the DHCP, it is possible to provide the system to enter the power-saving mode.

According to the present invention, even in a network device which operates under the condition in which an address can be dynamically changed, power saving can be realized by entering the power-saving mode.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-245898 filed on Aug. 26, 2005, which is hereby incorporated by reference herein in its entirety.

The invention claimed is:

1. A device communicatable through a network by using an address corresponding to a predetermined communication protocol and capable of entering a power-saving state, the device comprising:
   a processing unit configured to start a first module for determining an address to be used by the device and a second module for processing the predetermined communication protocol; and
   a storage unit configured to store the address being used by the device,
   wherein the processing unit terminates the first module without terminating the second module when the device enters the power-saving state, and starts the first module to determine whether the address stored in the storage unit is usable, without re-starting the second module, when the power-saving state is released, and
   wherein, if the address stored in the storage unit is usable, the device uses the address after the power-saving state is released.

2. The device according to claim 1, wherein the device uses a new address after the power-saving state is released if the address stored on the storage unit is not usable.

3. The device according to claim 1, wherein the processing unit outputs information including the address to the network, and depending on existence of a response, determines whether the address is usable.

4. The device according to claim 1, the device further comprising:
   a control information storage unit configured to store control information for returning a process from the power-saving state to the processing operation at the time when the device enters the power-saving state,
   wherein the processing unit returns the process from the power-saving state to the processing operation by using the control information stored on the control information storage unit when the power-saving state is released.

5. The device according to claim 1, wherein the storage unit stores a name which is used by the device and used for identifying the device on the network;
   the processing unit determines whether the name stored on the storage unit is usable when the power-saving state is released; and
   the device uses the name when the name stored on the storage unit is usable.

6. The device according to claim 1, wherein the address is a protocol address of a protocol in which the protocol address can be dynamically changed.

7. The device according to claim 1, wherein the address stored on the storage unit includes a network number; and
   the processing unit, by starting the first module, determines whether the address is usable depending on whether the address stored on the storage unit is within a range of a network number of a router.

8. The device according to claim 1, wherein the processing unit, by starting the first module, determines whether the address is usable depending on whether the address stored on the storage unit is used by the other devices.

9. A control method for a device communicatable through a network by using an address corresponding to a predetermined communication protocol and capable of entering a power-saving state, the method comprising:
- starting a first module for determining an address to be used by the device;
- starting a second module for processing the predetermined communication protocol;
- storing an address being used by the device in a storage unit;
- terminating the first module without terminating the second module when the device enters the power-saving state; and
- starting the first module to determine whether the address stored on the storage unit is usable, without re-starting the second module, when the power-saving state is released,
- wherein, if the address stored in the storage unit is usable, the device uses the address.

10. A computer readable medium containing computer-executable instructions for communicating through a network by a device by using an address corresponding to a predetermined communication protocol and capable of entering a power-saving state, the medium comprising:
- computer-executable instructions for starting a first module for determining an address to be used by the device;
- computer-executable instructions for starting a second module for processing the predetermined communication protocol;
- computer-executable instructions for storing the address corresponding to the predetermined communication protocol in a memory;
- computer-executable instructions for terminating the first module without terminating the second module when the computer enters the power-saving state; and
- computer-executable instructions for starting the first module to determining whether the address stored on the memory is usable, without re-starting the second module, when the power-saving state is released,
- wherein, if the address stored in the memory is usable, the computer uses the address.

* * * * *